(12) United States Patent
Dennison et al.

(10) Patent No.: US 9,043,894 B1
(45) Date of Patent: May 26, 2015

(54) MALICIOUS SOFTWARE DETECTION IN A COMPUTING SYSTEM

(71) Applicant: Palantir Technologies Inc., Palo Alto, CA (US)

(72) Inventors: Drew Dennison, Palo Alto, CA (US); Geoff Stowe, San Francisco, CA (US); Adam Anderson, San Francisco, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 14/616,080

(22) Filed: Feb. 6, 2015

Related U.S. Application Data

(60) Provisional application No. 62/076,314, filed on Nov. 6, 2014.

(51) Int. Cl.
H04L 29/06 (2006.01)
(52) U.S. Cl.
CPC ...................................... H04L 63/14 (2013.01)
(58) Field of Classification Search
CPC ........................................................ H04L 63/14
USPC ............................................................ 726/11
See application file for complete search history.

(56) References Cited

U.S. PATENT DOCUMENTS

| | | | |
|---|---|---|---|
| 5,109,399 A | 4/1992 | Thompson | |
| 5,329,108 A | 7/1994 | Lamoure | |
| 5,632,009 A | 5/1997 | Rao et al. | |
| 5,670,987 A | 9/1997 | Doi et al. | |
| 5,781,704 A | 7/1998 | Rossmo | |
| 5,845,300 A | 12/1998 | Comer | |
| 6,057,757 A | 5/2000 | Arrowsmith et al. | |
| 6,091,956 A | 7/2000 | Hollenberg | |
| 6,161,098 A | 12/2000 | Wallman | |
| 6,219,053 B1 | 4/2001 | Tachibana et al. | |
| 6,232,971 B1 | 5/2001 | Haynes | |

(Continued)

FOREIGN PATENT DOCUMENTS

| | | |
|---|---|---|
| CN | 101729531 | 6/2010 |
| CN | 103281301 | 9/2013 |

(Continued)

OTHER PUBLICATIONS

"A First Look: Predicting Market Demand for Food Retail using a Huff Analysis," TRF Policy Solutions, Jul. 2012, pp. 30.

(Continued)

*Primary Examiner* — Dant Shaifer Harriman
(74) *Attorney, Agent, or Firm* — Knobbe, Martens, Olson & Bear, LLP

(57) ABSTRACT

A computer system identifies malicious Uniform Resource Locator (URL) data items from a plurality of unscreened data items that have not been previously identified as associated with malicious URLs. The system can execute a number of pre-filters to identify a subset of URLs in the plurality of data items that are likely to be malicious. A scoring processor can score the subset of URLs based on a plurality of input vectors using a suitable machine learning model. Optionally, the system can execute one or more post-filters on the score data to identify data items of interest. Such data items can be fed back into the system to improve machine learning or can be used to provide a notification that a particular resource within a local network is infected with malicious software.

9 Claims, 26 Drawing Sheets

(56) References Cited

U.S. PATENT DOCUMENTS

| | | |
|---|---|---|
| 6,247,019 B1 | 6/2001 | Davies |
| 6,279,018 B1 | 8/2001 | Kudrolli et al. |
| 6,341,310 B1 | 1/2002 | Leshem et al. |
| 6,369,835 B1 | 4/2002 | Lin |
| 6,456,997 B1 | 9/2002 | Shukla |
| 6,549,944 B1 | 4/2003 | Weinberg et al. |
| 6,567,936 B1 | 5/2003 | Yang et al. |
| 6,581,068 B1 | 6/2003 | Bensoussan et al. |
| 6,594,672 B1 | 7/2003 | Lampson et al. |
| 6,631,496 B1 | 10/2003 | Li et al. |
| 6,642,945 B1 | 11/2003 | Sharpe |
| 6,714,936 B1 | 3/2004 | Nevin, III |
| 6,775,675 B1 | 8/2004 | Nwabueze et al. |
| 6,807,569 B1 | 10/2004 | Bhimani et al. |
| 6,828,920 B2 | 12/2004 | Owen et al. |
| 6,839,745 B1 | 1/2005 | Dingari et al. |
| 6,877,137 B1 | 4/2005 | Rivette et al. |
| 6,976,210 B1 | 12/2005 | Silva et al. |
| 6,980,984 B1 | 12/2005 | Huffman et al. |
| 6,985,950 B1 | 1/2006 | Hanson et al. |
| 7,036,085 B2 | 4/2006 | Barros |
| 7,043,702 B2 | 5/2006 | Chi et al. |
| 7,055,110 B2 | 5/2006 | Kupka et al. |
| 7,139,800 B2 | 11/2006 | Bellotti et al. |
| 7,158,878 B2 | 1/2007 | Rasmussen et al. |
| 7,162,475 B2 | 1/2007 | Ackerman |
| 7,168,039 B2 | 1/2007 | Bertram |
| 7,171,427 B2 | 1/2007 | Witowski et al. |
| 7,269,786 B1 | 9/2007 | Malloy et al. |
| 7,278,105 B1 | 10/2007 | Kitts |
| 7,290,698 B2 | 11/2007 | Poslinski et al. |
| 7,333,998 B2 | 2/2008 | Heckerman et al. |
| 7,370,047 B2 | 5/2008 | Gorman |
| 7,373,669 B2 | 5/2008 | Eisen |
| 7,379,811 B2 | 5/2008 | Rasmussen et al. |
| 7,379,903 B2 | 5/2008 | Caballero et al. |
| 7,426,654 B2 | 9/2008 | Adams et al. |
| 7,451,397 B2 | 11/2008 | Weber et al. |
| 7,454,466 B2 | 11/2008 | Bellotti et al. |
| 7,467,375 B2 | 12/2008 | Tondreau et al. |
| 7,487,139 B2 | 2/2009 | Fraleigh et al. |
| 7,502,786 B2 | 3/2009 | Liu et al. |
| 7,525,422 B2 | 4/2009 | Bishop et al. |
| 7,529,727 B2 | 5/2009 | Arning et al. |
| 7,546,245 B2 | 6/2009 | Surpin et al. |
| 7,558,677 B2 | 7/2009 | Jones |
| 7,574,428 B2 | 8/2009 | Leiserowitz et al. |
| 7,579,965 B2 | 8/2009 | Bucholz |
| 7,596,285 B2 | 9/2009 | Brown et al. |
| 7,614,006 B2 | 11/2009 | Molander |
| 7,617,232 B2 | 11/2009 | Gabbert et al. |
| 7,620,628 B2 | 11/2009 | Kapur et al. |
| 7,627,812 B2 | 12/2009 | Chamberlain et al. |
| 7,634,717 B2 | 12/2009 | Chamberlain et al. |
| 7,640,173 B2 | 12/2009 | Surpin et al. |
| 7,703,021 B1 | 4/2010 | Flam |
| 7,712,049 B2 | 5/2010 | Williams et al. |
| 7,716,067 B2 | 5/2010 | Surpin et al. |
| 7,716,077 B1 | 5/2010 | Mikurak |
| 7,725,547 B2 | 5/2010 | Albertson et al. |
| 7,770,100 B2 | 8/2010 | Chamberlain et al. |
| 7,783,658 B1 | 8/2010 | Bayliss |
| 7,805,457 B1 | 9/2010 | Viola et al. |
| 7,809,703 B2 | 10/2010 | Balabhadrapatruni et al. |
| 7,814,102 B2 | 10/2010 | Miller et al. |
| 7,818,658 B2 | 10/2010 | Chen |
| 7,894,984 B2 | 2/2011 | Rasmussen et al. |
| 7,899,611 B2 | 3/2011 | Downs et al. |
| 7,917,376 B2 | 3/2011 | Bellin et al. |
| 7,920,963 B2 | 4/2011 | Jouline et al. |
| 7,933,862 B2 | 4/2011 | Chamberlain et al. |
| 7,962,281 B2 | 6/2011 | Rasmussen et al. |
| 7,962,848 B2 | 6/2011 | Bertram |
| 7,970,240 B1 | 6/2011 | Chao et al. |
| 7,971,150 B2 | 6/2011 | Raskutti et al. |
| 8,001,465 B2 | 8/2011 | Kudrolli et al. |
| 8,001,482 B2 | 8/2011 | Bhattiprolu et al. |
| 8,010,545 B2 | 8/2011 | Stefik et al. |
| 8,010,886 B2 | 8/2011 | Gusmorino et al. |
| 8,015,487 B2 | 9/2011 | Roy et al. |
| 8,019,709 B2 | 9/2011 | Norton et al. |
| 8,024,778 B2 | 9/2011 | Cash et al. |
| 8,036,632 B1 | 10/2011 | Cona et al. |
| 8,046,362 B2 | 10/2011 | Bayliss |
| 8,082,172 B2 | 12/2011 | Chao et al. |
| 8,103,543 B1 | 1/2012 | Zwicky |
| 8,134,457 B2 | 3/2012 | Velipasalar et al. |
| 8,135,679 B2 | 3/2012 | Bayliss |
| 8,135,719 B2 | 3/2012 | Bayliss |
| 8,145,703 B2 | 3/2012 | Frishert et al. |
| 8,214,361 B1 | 7/2012 | Sandler et al. |
| 8,214,764 B2 | 7/2012 | Gemmell et al. |
| 8,225,201 B2 | 7/2012 | Michael |
| 8,229,947 B2 | 7/2012 | Fujinaga |
| 8,230,333 B2 | 7/2012 | Decherd et al. |
| 8,239,668 B1 | 8/2012 | Chen et al. |
| 8,266,168 B2 | 9/2012 | Bayliss |
| 8,280,880 B1 | 10/2012 | Aymeloglu et al. |
| 8,290,942 B2 | 10/2012 | Jones et al. |
| 8,301,464 B1 | 10/2012 | Cave et al. |
| 8,301,904 B1 | 10/2012 | Gryaznov |
| 8,312,367 B2 | 11/2012 | Foster |
| 8,312,546 B2 | 11/2012 | Alme |
| 8,321,943 B1 | 11/2012 | Walters et al. |
| 8,347,398 B1 | 1/2013 | Weber |
| 8,352,881 B2 | 1/2013 | Champion et al. |
| 8,368,695 B2 | 2/2013 | Howell et al. |
| 8,397,171 B2 | 3/2013 | Klassen et al. |
| 8,411,046 B2 | 4/2013 | Kruzeniski et al. |
| 8,412,707 B1 | 4/2013 | Mianji |
| 8,447,674 B2 | 5/2013 | Choudhuri et al. |
| 8,447,722 B1 | 5/2013 | Ahuja et al. |
| 8,452,790 B1 | 5/2013 | Mianji |
| 8,463,036 B1 | 6/2013 | Ramesh et al. |
| 8,484,168 B2 | 7/2013 | Bayliss |
| 8,489,331 B2 | 7/2013 | Kopf et al. |
| 8,489,641 B1 | 7/2013 | Seefeld et al. |
| 8,495,077 B2 | 7/2013 | Bayliss |
| 8,498,969 B2 | 7/2013 | Bayliss |
| 8,498,984 B1 | 7/2013 | Hwang et al. |
| 8,514,082 B2 | 8/2013 | Cova et al. |
| 8,515,207 B2 | 8/2013 | Chau |
| 8,554,579 B2 | 10/2013 | Tribble et al. |
| 8,554,709 B2 | 10/2013 | Goodson et al. |
| 8,577,911 B1 | 11/2013 | Stepinski et al. |
| 8,589,273 B2 | 11/2013 | Creeden et al. |
| 8,600,872 B1 | 12/2013 | Yan |
| 8,620,641 B2 | 12/2013 | Farnsworth et al. |
| 8,646,080 B2 | 2/2014 | Williamson et al. |
| 8,676,597 B2 | 3/2014 | Buehler et al. |
| 8,676,857 B1 | 3/2014 | Adams et al. |
| 8,689,108 B1 | 4/2014 | Duffield et al. |
| 8,707,185 B2 | 4/2014 | Robinson et al. |
| 8,713,467 B1 | 4/2014 | Goldenberg et al. |
| 8,726,379 B1 | 5/2014 | Stiansen et al. |
| 8,739,278 B2 | 5/2014 | Varghese |
| 8,742,934 B1 | 6/2014 | Sarpy, Sr. et al. |
| 8,745,516 B2 | 6/2014 | Mason et al. |
| 8,756,224 B2 | 6/2014 | Dassa et al. |
| 8,781,169 B2 | 7/2014 | Jackson et al. |
| 8,788,405 B1 | 7/2014 | Sprague et al. |
| 8,788,407 B1 | 7/2014 | Singh et al. |
| 8,799,799 B1 | 8/2014 | Cervelli et al. |
| 8,799,812 B2 | 8/2014 | Parker |
| 8,812,960 B1 | 8/2014 | Sun et al. |
| 8,818,892 B1 | 8/2014 | Sprague et al. |
| 8,830,322 B2 | 9/2014 | Nerayoff et al. |
| 8,832,594 B1 | 9/2014 | Thompson et al. |
| 8,868,486 B2 | 10/2014 | Tamayo |
| 8,917,274 B2 | 12/2014 | Ma et al. |
| 8,924,872 B1 | 12/2014 | Bogomolov et al. |
| 8,937,619 B2 | 1/2015 | Sharma et al. |
| 2002/0033848 A1 | 3/2002 | Sciammarella et al. |
| 2002/0091707 A1 | 7/2002 | Keller |

(56) References Cited

U.S. PATENT DOCUMENTS

| | | |
|---|---|---|
| 2002/0095658 A1 | 7/2002 | Shulman |
| 2002/0116120 A1 | 8/2002 | Ruiz et al. |
| 2002/0174201 A1 | 11/2002 | Ramer et al. |
| 2003/0039948 A1 | 2/2003 | Donahue |
| 2003/0097330 A1 | 5/2003 | Hillmer et al. |
| 2003/0144868 A1 | 7/2003 | MacIntyre et al. |
| 2003/0225755 A1 | 12/2003 | Iwayama et al. |
| 2003/0229848 A1 | 12/2003 | Arend et al. |
| 2004/0032432 A1 | 2/2004 | Baynger |
| 2004/0064256 A1 | 4/2004 | Barinek et al. |
| 2004/0085318 A1 | 5/2004 | Hassler et al. |
| 2004/0095349 A1 | 5/2004 | Bito et al. |
| 2004/0111410 A1 | 6/2004 | Burgoon et al. |
| 2004/0143602 A1 | 7/2004 | Ruiz et al. |
| 2004/0193600 A1 | 9/2004 | Kaasten et al. |
| 2004/0205524 A1 | 10/2004 | Richter et al. |
| 2004/0260702 A1 | 12/2004 | Cragun et al. |
| 2005/0027705 A1 | 2/2005 | Sadri et al. |
| 2005/0028094 A1 | 2/2005 | Allyn |
| 2005/0080769 A1 | 4/2005 | Gemmell |
| 2005/0086207 A1 | 4/2005 | Heuer et al. |
| 2005/0125715 A1 | 6/2005 | Di Franco et al. |
| 2005/0162523 A1 | 7/2005 | Darrell et al. |
| 2005/0180330 A1 | 8/2005 | Shapiro |
| 2005/0182793 A1 | 8/2005 | Keenan et al. |
| 2005/0183005 A1 | 8/2005 | Denoue et al. |
| 2005/0222928 A1 | 10/2005 | Steier et al. |
| 2005/0229256 A2 | 10/2005 | Banzhof |
| 2005/0246327 A1 | 11/2005 | Yeung et al. |
| 2005/0251786 A1 | 11/2005 | Citron et al. |
| 2006/0026120 A1 | 2/2006 | Carolan et al. |
| 2006/0026170 A1 | 2/2006 | Kreitler et al. |
| 2006/0059139 A1 | 3/2006 | Robinson |
| 2006/0069912 A1 | 3/2006 | Zheng et al. |
| 2006/0074881 A1 | 4/2006 | Vembu et al. |
| 2006/0080619 A1 | 4/2006 | Carlson et al. |
| 2006/0129746 A1 | 6/2006 | Porter |
| 2006/0139375 A1 | 6/2006 | Rasmussen et al. |
| 2006/0203337 A1 | 9/2006 | White |
| 2006/0218637 A1 | 9/2006 | Thomas et al. |
| 2006/0242040 A1 | 10/2006 | Rader |
| 2006/0265747 A1 | 11/2006 | Judge |
| 2006/0271277 A1 | 11/2006 | Hu et al. |
| 2006/0279630 A1 | 12/2006 | Aggarwal et al. |
| 2007/0011150 A1 | 1/2007 | Frank |
| 2007/0016363 A1 | 1/2007 | Huang et al. |
| 2007/0038962 A1 | 2/2007 | Fuchs et al. |
| 2007/0057966 A1 | 3/2007 | Ohno et al. |
| 2007/0078832 A1 | 4/2007 | Ott et al. |
| 2007/0083541 A1 | 4/2007 | Fraleigh et al. |
| 2007/0192265 A1 | 8/2007 | Chopin et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0266336 A1 | 11/2007 | Nojima et al. |
| 2007/0294200 A1 | 12/2007 | Au |
| 2007/0294643 A1 | 12/2007 | Kyle |
| 2007/0294766 A1 | 12/2007 | Mir et al. |
| 2008/0040684 A1 | 2/2008 | Crump |
| 2008/0051989 A1 | 2/2008 | Welsh |
| 2008/0052142 A1 | 2/2008 | Bailey et al. |
| 2008/0077597 A1 | 3/2008 | Butler |
| 2008/0077642 A1 | 3/2008 | Carbone et al. |
| 2008/0104019 A1 | 5/2008 | Nath |
| 2008/0126951 A1 | 5/2008 | Sood et al. |
| 2008/0133567 A1 | 6/2008 | Ames et al. |
| 2008/0162616 A1 | 7/2008 | Gross et al. |
| 2008/0195608 A1 | 8/2008 | Clover |
| 2008/0222295 A1 | 9/2008 | Robinson et al. |
| 2008/0229422 A1 | 9/2008 | Hudis et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0278311 A1 | 11/2008 | Grange et al. |
| 2008/0288306 A1 | 11/2008 | MacIntyre et al. |
| 2008/0301643 A1 | 12/2008 | Appleton et al. |
| 2009/0002492 A1 | 1/2009 | Velipasalar et al. |
| 2009/0018940 A1 | 1/2009 | Wang et al. |
| 2009/0027418 A1 | 1/2009 | Maru et al. |
| 2009/0030915 A1 | 1/2009 | Winter et al. |
| 2009/0044279 A1 | 2/2009 | Crawford et al. |
| 2009/0055251 A1 | 2/2009 | Shah et al. |
| 2009/0083184 A1 | 3/2009 | Eisen |
| 2009/0088964 A1 | 4/2009 | Schaaf et al. |
| 2009/0103442 A1 | 4/2009 | Douville |
| 2009/0119309 A1 | 5/2009 | Gibson et al. |
| 2009/0125369 A1 | 5/2009 | Kloostra et al. |
| 2009/0132921 A1 | 5/2009 | Hwangbo et al. |
| 2009/0132953 A1 | 5/2009 | Reed et al. |
| 2009/0144262 A1 | 6/2009 | White et al. |
| 2009/0144274 A1 | 6/2009 | Fraleigh et al. |
| 2009/0164934 A1 | 6/2009 | Bhattiprolu et al. |
| 2009/0171939 A1 | 7/2009 | Athsani et al. |
| 2009/0179892 A1 | 7/2009 | Tsuda et al. |
| 2009/0192957 A1 | 7/2009 | Subramanian et al. |
| 2009/0222400 A1 | 9/2009 | Kupershmidt et al. |
| 2009/0222760 A1 | 9/2009 | Halverson et al. |
| 2009/0234720 A1 | 9/2009 | George et al. |
| 2009/0281839 A1 | 11/2009 | Lynn et al. |
| 2009/0287470 A1 | 11/2009 | Farnsworth et al. |
| 2009/0292626 A1 | 11/2009 | Oxford |
| 2009/0328222 A1 | 12/2009 | Helman et al. |
| 2010/0011282 A1 | 1/2010 | Dollard et al. |
| 2010/0042922 A1 | 2/2010 | Bradateanu et al. |
| 2010/0057716 A1 | 3/2010 | Stefik et al. |
| 2010/0070523 A1 | 3/2010 | Delgo et al. |
| 2010/0070842 A1 | 3/2010 | Aymeloglu et al. |
| 2010/0070897 A1 | 3/2010 | Aymeloglu et al. |
| 2010/0077481 A1 | 3/2010 | Polyakov et al. |
| 2010/0077483 A1 | 3/2010 | Stolfo et al. |
| 2010/0100963 A1 | 4/2010 | Mahaffey |
| 2010/0114887 A1 | 5/2010 | Conway et al. |
| 2010/0122152 A1 | 5/2010 | Chamberlain et al. |
| 2010/0125546 A1 | 5/2010 | Barrett et al. |
| 2010/0131457 A1 | 5/2010 | Heimendinger |
| 2010/0162176 A1 | 6/2010 | Dunton |
| 2010/0185691 A1 | 7/2010 | Irmak et al. |
| 2010/0191563 A1 | 7/2010 | Schlaifer et al. |
| 2010/0198684 A1 | 8/2010 | Eraker et al. |
| 2010/0199225 A1 | 8/2010 | Coleman et al. |
| 2010/0250412 A1 | 9/2010 | Wagner |
| 2010/0280857 A1 | 11/2010 | Liu et al. |
| 2010/0293174 A1 | 11/2010 | Bennett et al. |
| 2010/0306029 A1 | 12/2010 | Jolley |
| 2010/0306713 A1 | 12/2010 | Geisner et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0047159 A1 | 2/2011 | Baid et al. |
| 2011/0060753 A1 | 3/2011 | Shaked et al. |
| 2011/0061013 A1 | 3/2011 | Bilicki et al. |
| 2011/0074811 A1 | 3/2011 | Hanson et al. |
| 2011/0078173 A1 | 3/2011 | Seligmann et al. |
| 2011/0087519 A1 | 4/2011 | Fordyce, III et al. |
| 2011/0117878 A1 | 5/2011 | Barash et al. |
| 2011/0119100 A1 | 5/2011 | Ruhl et al. |
| 2011/0137766 A1 | 6/2011 | Rasmussen et al. |
| 2011/0153384 A1 | 6/2011 | Horne et al. |
| 2011/0167105 A1 | 7/2011 | Ramakrishnan et al. |
| 2011/0167493 A1 | 7/2011 | Song et al. |
| 2011/0170799 A1 | 7/2011 | Carrino et al. |
| 2011/0173032 A1 | 7/2011 | Payne et al. |
| 2011/0173093 A1 | 7/2011 | Psota et al. |
| 2011/0178842 A1 | 7/2011 | Rane et al. |
| 2011/0208724 A1 | 8/2011 | Jones et al. |
| 2011/0218934 A1 | 9/2011 | Elser |
| 2011/0219450 A1 | 9/2011 | McDougal et al. |
| 2011/0225198 A1 | 9/2011 | Edwards et al. |
| 2011/0231223 A1 | 9/2011 | Winters |
| 2011/0238510 A1 | 9/2011 | Rowen et al. |
| 2011/0238570 A1 | 9/2011 | Li et al. |
| 2011/0291851 A1 | 12/2011 | Whisenant |
| 2011/0307382 A1 | 12/2011 | Siegel et al. |

(56) References Cited

U.S. PATENT DOCUMENTS

| | | |
|---|---|---|
| 2011/0310005 A1 | 12/2011 | Chen et al. |
| 2012/0019559 A1 | 1/2012 | Siler et al. |
| 2012/0036013 A1 | 2/2012 | Neuhaus et al. |
| 2012/0036434 A1 | 2/2012 | Oberstein |
| 2012/0066296 A1 | 3/2012 | Appleton et al. |
| 2012/0079363 A1 | 3/2012 | Folting et al. |
| 2012/0084135 A1 | 4/2012 | Nissan et al. |
| 2012/0084866 A1 | 4/2012 | Stolfo |
| 2012/0106801 A1 | 5/2012 | Jackson |
| 2012/0110633 A1 | 5/2012 | An et al. |
| 2012/0117082 A1 | 5/2012 | Koperda et al. |
| 2012/0131512 A1 | 5/2012 | Takeuchi et al. |
| 2012/0144335 A1 | 6/2012 | Abeln et al. |
| 2012/0159307 A1 | 6/2012 | Chung et al. |
| 2012/0159399 A1 | 6/2012 | Bastide et al. |
| 2012/0173985 A1 | 7/2012 | Peppel |
| 2012/0196557 A1 | 8/2012 | Reich et al. |
| 2012/0196558 A1 | 8/2012 | Reich et al. |
| 2012/0208636 A1 | 8/2012 | Feige |
| 2012/0215898 A1 | 8/2012 | Shah et al. |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0266245 A1 | 10/2012 | McDougal et al. |
| 2012/0290879 A1 | 11/2012 | Shibuya et al. |
| 2012/0296907 A1 | 11/2012 | Long et al. |
| 2012/0304244 A1 | 11/2012 | Xie et al. |
| 2012/0310831 A1 | 12/2012 | Harris et al. |
| 2012/0310838 A1 | 12/2012 | Harris et al. |
| 2012/0323829 A1 | 12/2012 | Stokes et al. |
| 2012/0323888 A1 | 12/2012 | Osann, Jr. |
| 2012/0330801 A1 | 12/2012 | McDougal et al. |
| 2012/0330973 A1 | 12/2012 | Ghuneim et al. |
| 2013/0006725 A1 | 1/2013 | Simanek et al. |
| 2013/0019306 A1 | 1/2013 | Lagar-Cavilla et al. |
| 2013/0024307 A1 | 1/2013 | Fuerstenberg et al. |
| 2013/0024339 A1 | 1/2013 | Choudhuri et al. |
| 2013/0046842 A1 | 2/2013 | Muntz et al. |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0078943 A1 | 3/2013 | Biage et al. |
| 2013/0097482 A1 | 4/2013 | Marantz et al. |
| 2013/0101159 A1 | 4/2013 | Chao et al. |
| 2013/0111320 A1 | 5/2013 | Campbell et al. |
| 2013/0117651 A1 | 5/2013 | Waldman et al. |
| 2013/0139268 A1 | 5/2013 | An et al. |
| 2013/0150004 A1 | 6/2013 | Rosen |
| 2013/0157234 A1 | 6/2013 | Gulli et al. |
| 2013/0160120 A1 | 6/2013 | Malaviya et al. |
| 2013/0176321 A1 | 7/2013 | Mitchell et al. |
| 2013/0179420 A1 | 7/2013 | Park et al. |
| 2013/0211985 A1 | 8/2013 | Clark et al. |
| 2013/0224696 A1 | 8/2013 | Wolfe et al. |
| 2013/0232045 A1 | 9/2013 | Tai et al. |
| 2013/0238616 A1 | 9/2013 | Rose et al. |
| 2013/0246170 A1 | 9/2013 | Gross et al. |
| 2013/0251233 A1 | 9/2013 | Yang et al. |
| 2013/0262527 A1 | 10/2013 | Hunter et al. |
| 2013/0263019 A1 | 10/2013 | Castellanos et al. |
| 2013/0268520 A1 | 10/2013 | Fisher et al. |
| 2013/0279757 A1 | 10/2013 | Kephart |
| 2013/0282696 A1 | 10/2013 | John et al. |
| 2013/0290011 A1 | 10/2013 | Lynn et al. |
| 2013/0290825 A1 | 10/2013 | Arndt et al. |
| 2013/0297619 A1 | 11/2013 | Chandrasekaran et al. |
| 2013/0318594 A1 | 11/2013 | Hoy et al. |
| 2013/0339218 A1 | 12/2013 | Subramanian et al. |
| 2014/0006109 A1 | 1/2014 | Callioni et al. |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0040371 A1 | 2/2014 | Gurevich et al. |
| 2014/0047357 A1 | 2/2014 | Alfaro et al. |
| 2014/0059038 A1 | 2/2014 | McPherson et al. |
| 2014/0059683 A1 | 2/2014 | Ashley |
| 2014/0068487 A1 | 3/2014 | Steiger et al. |
| 2014/0095509 A1 | 4/2014 | Patton |
| 2014/0108068 A1 | 4/2014 | Williams |
| 2014/0108380 A1 | 4/2014 | Gotz et al. |
| 2014/0108985 A1 | 4/2014 | Scott et al. |
| 2014/0149272 A1 | 5/2014 | Hirani et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0195515 A1 | 7/2014 | Baker et al. |
| 2014/0195887 A1 | 7/2014 | Ellis et al. |
| 2014/0279824 A1 | 9/2014 | Tamayo |
| 2014/0310282 A1 | 10/2014 | Sprague et al. |
| 2014/0316911 A1 | 10/2014 | Gross |
| 2014/0333651 A1 | 11/2014 | Cervelli et al. |
| 2014/0337772 A1 | 11/2014 | Cervelli et al. |

FOREIGN PATENT DOCUMENTS

| | | |
|---|---|---|
| DE | 10 2014 103 482 | 9/2014 |
| EP | 1 191 463 | 3/2002 |
| EP | 1 672 527 | 6/2006 |
| EP | 2 551 799 | 1/2013 |
| EP | 2 778 977 | 9/2014 |
| EP | 2 778 983 | 9/2014 |
| EP | 2 779 082 | 9/2014 |
| GB | 2 516 155 | 1/2015 |
| WO | WO 00/09529 | 2/2000 |
| WO | WO 2005/104736 | 11/2005 |
| WO | WO 2008/011728 | 1/2008 |
| WO | WO 2009/061501 | 5/2009 |
| WO | WO 2010/000014 | 1/2010 |
| WO | WO 2010/030913 | 3/2010 |
| WO | WO 2013/126281 | 8/2013 |

OTHER PUBLICATIONS

"A Quick Guide to UniProtKB Swiss-Prot & TrEMBL," Sep. 2011, pp. 2.

Acklen, Laura, "Absolute Beginner's Guide to Microsoft Word 2003," Dec. 24, 2003, pp. 15-18, 34-41, 308-316.

Alfred, Rayner "Summarizing Relational Data Using Semi-Supervised Genetic Algorithm-Based Clustering Techniques", Journal of Computer Science, 2010, vol. 6, No. 7, pp. 775-784.

Ananiev et al., "The New Modality API," http://web.archive.org/web/20061211011958/http://java.sun.com/developer/technicalArticles/J2SE/Desktop/javase6/modality/ Jan. 21, 2006, pp. 8.

Baker et al., "The Development of a Common Enumeration of Vulnerabilities and Exposures," Presented at the Second International Workshop on Recent Advances in Intrusion Detection, Sep. 7-9, 1999, pp. 35.

Bluttman et al., "Excel Formulas and Functions for Dummies," 2005, Wiley Publishing, Inc., pp. 280, 284-286.

Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.

Canese et al., "Chapter 2: PubMed: The Bibliographic Database," The NCBI Handbook, Oct. 2002, pp. 1-10.

Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.

Conner, Nancy, "Google Apps: The Missing Manual," Sharing and Collaborating on Documents, May 1, 2008, pp. 93-97, 106-113 & 120-121.

Delcher et al., "Identifying Bacterial Genes and Endosymbiont DNA with Glimmer," BioInformatics, vol. 23, No. 6, 2007, pp. 673-679.

Dramowicz, Ela, "Retail Trade Area Analysis Using the Huff Model," Directions Magazine http://www,directionsmag.com/articles/retail-trade-area-analysis-using-the-huff-model/123411, Jul. 2, 2005 in 10 pages.

(56) References Cited

OTHER PUBLICATIONS

FireEye, http://www.fireeye.com/ Printed Jun. 30, 2014 in 2 pages.
FireEye—Products and Solutions Overview, http://www.fireeye.com/products-and-solutions Printed Jun. 30, 2014 in 3 pages.
GIS-NET 3 Public—Department of Regional Planning. Planning & Zoning Information for Unincorporated LA County. Retrieved Oct. 2, 2013 from http://gis.planning.lacounty.gov/GIS-NETs_Public/Viewer.html.
Goswami, Gautam, "Quite 'Writely' Said!" One Brick at a Time, Aug. 21, 2005, pp. 7.
Griffith, Daniel A., "A Generalized Huff Model," Geographical Analysis, Apr. 1982, vol. 14, No. 2, pp. 135-144.
Hansen et al., "Analyzing Social Media Networks with NodeXL: Insights from a Connected World", Elsevier Science, Sep. 2010, Ch. 4 & 10, pp. 53-67 & 143-164.
Hibbert et al., "Prediction of Shopping Behavior Using a Huff Model Within a GIS Framework," Healthy Eating in Context, Mar. 18, 2011, pp. 16.
Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-Dec. 2003, pp. 34-36.
Kahan et al., "Annotea: An Open RDF Infrastructure for Shared WEB Annotations", Computer Networks, 2002, vol. 39, pp. 589-608.
Keylines.com, "An Introduction to KeyLines and Network Visualization," Mar. 2014, http://keylines.com/wp-content/uploads/2014/03/KeyLines-White-Paper.pdf downloaded May 12, 2014 in 8 pages.
Keylines.com, "KeyLines Datasheet," Mar. 2014, http://keylines.com/wp-content/uploads/2014/03/KeyLines-datasheet.pdf downloaded May 12, 2014 in 2 pages.
Keylines.com, "Visualizing Threats: Improved Cyber Security Through Network Visualization," Apr. 2014, http://keylines.com/wp-content/uploads/2014/04/Visualizing-Threats1.pdf downloaded May 12, 2014 in 10 pages.
Kitts, Paul, "Chapter 14: Genome Assembly and Annotation Process," The NCBI Handbook, Oct. 2002, pp. 1-21.
Lee et al., "A Data Mining and CIDF Based Approach for Detecting Novel and Distributed Intrusions," Lecture Notes in Computer Science, vol. 1907 Nov. 11, 2000, pp. 49-65.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Madden, Tom, "Chapter 16: The BLAST Sequence Analysis Tool," The NCBI Handbook, Oct. 2002, pp. 1-15.
Manno et al., "Introducing Collaboration in Single-user Applications through the Centralized Control Architecture," 2010, pp. 10.
Manske, "File Saving Dialogs," http://www.mozilla.org/editor/ui_specs/FileSaveDialogs.html, Jan. 20, 1999, pp. 7.
Map of San Jose, CA. Retrieved Oct. 2, 2013 from http://maps.bing.com.
Map of San Jose, CA. Retrieved Oct. 2, 2013 from http://maps.google.com.
Map of San Jose, CA. Retrieved Oct. 2, 2013 from http://maps.yahoo.com.
Microsoft—Developer Network, "Getting Started with VBA in Word 2010," Apr. 2010, http://msdn.microsoft.com/en-us/library/ff604039%28v=office.14%29.aspx as printed Apr. 4, 2014 in 17 pages.
Microsoft Office—Visio, "About connecting shapes," http://office.microsoft.com/en-us/visio-help/about-connecting-shapes-HP085050369.aspx printed Aug. 4, 2011 in 6 pages.
Microsoft Office—Visio, "Add and glue connectors with the Connector tool," http://office.microsoft.com/en-us/visio-help/add-and-glue-connectors-with-the-connector-tool-HA010048532.aspx?CTT=1 printed Aug. 4, 2011 in 1 page.
Mizrachi, Ilene, "Chapter 1: GenBank: The Nuckeotide Sequence Database," The NCBI Handbook, Oct. 2002, pp. 1-14.
Palmas, et al., "An Edge-Bundling Layout for Interactive Parallel Coordinates," Proceedings of the 2014 IEEE Pacific Visualization Symposium, Mar. 2014, pp. 57-64.
Rouse, Margaret, "OLAP Cube," http://searchdatamanagement.techtarget.com/definition/OLAP-cube, Apr. 28, 2012, pp. 16.
Shah, Chintan, "Periodic Connections to Control Server Offer New Way to Detect Botnets," Oct. 24, 2013 in 6 pages, http://www.blogs.mcafee.com/mcafee-labs/periodic-links-to-control-server-offer-new-way-to-detect-botnets.
Sigrist, et al., "PROSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
"The FASTA Program Package," fasta-36.3.4, Mar. 25, 2011, pp. 29.
VirusTotal—About, http://www.virustotal.com/en/about/ Printed Jun. 30, 2014 in 8 pages.
Wiggerts, T.A., "Using Clustering Algorithms in Legacy Systems Remodularization," Reverse Engineering, Proceedings of the Fourth Working Conference, Netherlands, Oct. 6-8, 1997, IEEE Computer Soc., pp. 33-43.
Official Communication in New Zealand Application No. 622513 dated Apr. 3, 2014.
Official Communication in European Application No. EP 14158861.6 dated Jun. 16, 2014.
Official Communication in New Zealand Application No. 622517 dated Apr. 3, 2014.
Official Communication in British Application No. GB1408025.3 dated Nov. 6, 2014.
Official Communication in New Zealand Application No. 624557 dated May 14, 2014.
Official Communication in New Zealand Application No. 628585 dated Aug. 26, 2014.
Official Communication in British Application No. GB 1411984.6 dated Dec. 22, 2014.
Official Communication in New Zealand Application No. 627061 dated Jul. 14, 2014.
Official Communication in New Zealand Application No. 628495 dated Aug. 19, 2014.
Official Communication in New Zealand Application No. 628263 dated Aug. 12, 2014.
Official Communication in New Zealand Application No. 628150 dated Aug. 15, 2014.
Official Communication in New Zealand Application No. 628161 dated Aug. 25, 2014.
European Search Report in Application No. 14159535.5, dated May 22, 2014.
Official Communication in Great Britain Application No. 1404457.2 dated Aug. 14, 2014.
Official Communication in New Zealand Application No. 622181 dated Mar. 24, 2014.
Official Communication in New Zealand Application No. 627962 dated Aug. 5, 2014.
Official Communication in New Zealand Application No. 628840 dated Aug. 28, 2014.
Official Communication in European Patent Application No. 14159464.8 dated Jul. 31, 2014.

Domain Whois record

Queried whois.internic.net with "dom example.com"...

```
   Domain Name: EXAMPLE.COM
   Registrar: RESERVED-INTERNET ASSIGNED NUMBERS AUTHORITY
   Whois Server: whois.iana.org
   Referral URL: http://res-dom.iana.org
   Name Server: A.IANA-SERVERS.NET
   Name Server: B.IANA-SERVERS.NET
   Status: clientDeleteProhibited
   Status: clientTransferProhibited
   Status: clientUpdateProhibited
   Updated Date: 14-aug-2014
   Creation Date: 14-aug-1995
   Expiration Date: 13-aug-2015

>>> Last update of whois database: Wed, 24 Sep 2014 05:05:25 UTC <<<
```

Queried whois.iana.org with "example.com"...

```
domain:       EXAMPLE.COM organisation: Internet Assigned Numbers Authority created:      1992-01-01
source:       IANA
```

Network Whois record

Queried whois.ripe.net with "-B 93.184.216.119"...

```
% Information related to '93.184.216.0 - 93.184.216.255'

% Abuse contact for '93.184.216.0 - 93.184.216.255' is 'abuse@edgecast.com' inetnum:        93.184.216.0 - 93.184.216.255
netname:        EDGECAST-NETBLK-03
descr:          NETBLK-03-EU-93-184-216-0-24
country:        EU
admin-c:        DS7892-RIPE
tech-c:         DS7892-RIPE
status:         ASSIGNED PA
mnt-by:         MNT-EDGECAST
changed:        derrick@edgecast.com 20120622
source:         RIPE
notify:         inet@edgecast.com person:         Derrick Sawyer
address:        2850 Ocean Park Blvd., Suite 200, Santa Monica CA 90405 USA
phone:          +18773343236
nic-hdl:        DS7892-RIPE
changed:        derrick@edgecast.com 20120417
source:         RIPE
mnt-by:         MNT-EDGECAST % This query was served by the RIPE Database Query Service version 1.75 (DB-1)
```

MALICIOUS SOFTWARE DETECTION IN A COMPUTING SYSTEM

PRIORITY INFORMATION

This application claims the benefit of U.S. Provisional Application No. 62/076,314, filed Nov. 6, 2014, the entire contents of which is hereby expressly incorporated by reference herein in its entirety and for all purposes. In addition, any and all applications for which a foreign or domestic priority claim is identified in the Application Data Sheet as filed with the present application are also expressly incorporated by reference.

BACKGROUND

1. Field

This disclosure relates to systems for detecting malicious software in a computing system and methods and computer-related media related thereto.

2. Description of the Related Art

With millions of online resources that are available via millions of corresponding uniform resource locators (URLs), organizations have difficulty monitoring and identifying those information access requests that are associated with malicious content, such as malware or other malicious code. For example, tens of thousands of new malicious software programs are discovered each day, many of which are spread to users via online resources and, when executed, may transmit sensitive information from an organizations computer network to external (malicious) computing system. Thus, such malicious programs can compromise the security of computing systems.

SUMMARY

Disclosed herein are various systems, methods, and computer-readable media for detecting malicious software and/or otherwise undesirable access of online resources in a computing system, such as among a network of computers of an organization. At least some of the systems, methods, and media can analyze data, such as URL data items, transmitted by computing systems within a local network in order to identify the infected systems and/or systems that have or are likely to access undesirable online resources, thereby improving functioning of the local network. The disclosed systems, methods, and media also improve functioning of at least one computing system by reducing the data to be analyzed to those data items most likely associated with malicious software, significantly improving processing speed when determining potentially malicious addresses. It should be appreciated that the systems, methods, and media involve processing large pluralities of data that could not be done by a human. For example, a log of URLs transmitted by computing systems within a local network may include hundreds of thousands, millions, tens of millions, hundreds of millions, or even billions of data items, and may consume significant storage and/or memory. Parsing of URLs, obtaining additional information regarding URLs from external data sources, scoring the URLs based on multiple criteria, and selecting URLs potentially associated with malicious behavior, as well as other processes described herein, cannot feasibly be performed manually, especially in a time frame wherein potentially malicious URLs may be identified early enough to reduce impact of the malicious behavior.

The systems, methods, and devices described herein each have several aspects, no single one of which is solely responsible for its desirable attributes. Without limiting the scope of this disclosure, several non-limiting features will now be discussed briefly.

In at least one embodiment, a computer system to identify malicious Uniform Resource Locator (URL) data items from a plurality of unscreened data items that have not been previously identified as associated with malicious URLs is described. The system can have one, some, or all of the following features as well as other features described herein. The system can comprise one or more computer readable storage devices configured to store one or more software modules including computer executable instructions. The plurality of unscreened data items can be associated with communications between computerized devices within a local network and external resources. The unscreened data items can comprise a plurality of device identifiers for the computerized devices and a plurality of URLs referencing the external resources. The system can comprise a network connection configured to access, from a remote network not within the local network, a list of domain names satisfying a ranking condition based on Internet traffic data.

The foregoing systems also can have one, some, or all of the following features as well as other features described herein. The system can comprise one or more hardware computer processors in communication with the one or more computer readable storage devices and configured to execute the one or more software modules in order to cause the computer system to access, from the one or more computer readable storage devices, the plurality of unscreened data items. The computer processors can be configured to execute the one or more software modules in order to cause the computer system to identify, from the plurality of unscreened data items, a plurality of connection records, each of the connection records indicating a communication from a computerized device to an external resource at a specific time, such that each of the connection records is associated with a device identifier and a URL. The computer processors can be configured to execute the one or more software modules in order to cause the computer system to identify, from the plurality of connection records, one or more connection records having a common device identifier, the identified one or more connection records associated with one or more URLs. The computer processors can be configured to execute the one or more software modules in order to cause the computer system to parse the one or more URLs for one or more domain names, each of the one or more URLs associated with a domain name. The computer processors can be configured to execute the one or more software modules in order to cause the computer system to, based on a determination that none of the one or more domain names satisfies a threshold position in the list of domain names, designate the one or more URLs as possible malicious URL data items. The computer processors can be configured to execute the one or more software modules in order to cause the computer system to assign a score based on a plurality of factors relating to the possible malicious URL data items, the factors comprising the determination that none of the one or more domain names satisfies the threshold position in the list of domain names.

The foregoing systems also can have one, some, or all of the following features as well as other features described herein. The plurality of unscreened data items can comprise a plurality of beaconing malware-related data items and the one or more hardware computer processors further can be configured to execute the one or more software modules in order to cause the computer system to access, from the one or more computer readable storage devices, the plurality of beaconing malware-related data items. The computer processors can be configured to execute the one or more software modules in order to cause the computer system to generate, based on the accessed beaconing malware-related data items, a plurality of connection pairs, each of the connection pairs indicating communications between an internal source within the local network and an external destination that is not within the local network. The computer processors can be configured to execute the one or more software modules in order to cause the computer system to identify a plurality of connection pairs having a common internal source and a common external destination. The computer processors can be configured to execute the one or more software modules in order to cause the computer system to generate a time series of connection pairs based on the identified plurality of connection pairs. The computer processors can be configured to execute the one or more software modules in order to cause the computer system to filter out noise from the at least one time series to generate a filtered at least one time series. The computer processors can be configured to execute the one or more software modules in order to cause the computer system to compute a variance in the filtered at least one time series. The computer processors can be configured to execute the one or more software modules in order to cause the computer system to, based on a determination that the variance satisfies a threshold, designate a connection pair associated with the filtered at least one time series as a seed, the designated connection pair including the common internal source and the common external source. The computer processors can be configured to execute the one or more software modules in order to cause the computer system to generate a data item cluster based on the designated seed. Generating the data item cluster can comprise adding the designated seed to the data item cluster. Generating the data item cluster can comprise accessing, from the one or more computer readable storage devices, the clustering strategy. Generating the data item cluster can comprise adding to the data item cluster, based on the clustering strategy, one or more beaconing malware-related data items determined to be associated with the designated seed. The computer processors can be configured to execute the one or more software modules in order to cause the computer system to score the generated data item cluster, the factors comprising the data item cluster score.

The foregoing systems also can have one, some, or all of the following features as well as other features described herein. The one or more computer readable storage devices can be configured to store a plurality of domain names associated with URLs in communications from computerized devices within a local network from a period of time. The one or more hardware computer processors further can be configured to execute the one or more software modules in order to cause the computer system to access, from the one or more computer readable storage devices, the plurality of domain names. The one or more hardware computer processors further can be configured to execute the one or more software modules in order to cause the computer system to, based on a determination that none of the one or more domain names is included in the plurality of domain names, designate the one or more URLs as possible malicious URL data items. The factors can comprise the determination that none of the one or more domain names is included in the plurality of domain names.

The foregoing systems also can have one, some, or all of the following features as well as other features described herein. The one or more computer readable storage devices can be configured to store a plurality of dictionary words. The one or more hardware computer processors further can be configured to execute the one or more software modules in order to cause the computer system to access, from the one or more computer readable storage devices, the plurality of dictionary words. The one or more hardware computer processors further can be configured to execute the one or more software modules in order to cause the computer system to, based on a determination that none of the one or more domain names is included in the plurality of dictionary words, designate the one or more URLs as possible malicious URL data items. The factors can comprise the determination that none of the one or more domain names is included in the plurality of dictionary words.

The foregoing systems also can have one, some, or all of the following features as well as other features described herein. The one or more computer readable storage devices can be configured to store a plurality of filepaths associated with URLs in communications from computerized devices within a local network from a period of time. The one or more hardware computer processors further can be configured to execute the one or more software modules in order to cause the computer system to access, from the one or more computer readable storage devices, the plurality of filepaths. The one or more hardware computer processors further can be configured to execute the one or more software modules in order to cause the computer system to parse a URL for an associated filepath. The one or more hardware computer processors further can be configured to execute the one or more software modules in order to cause the computer system to, based on a determination that the filepath is included in the plurality of filepaths, designate the URL as a possible malicious URL data item. The factors can comprise the determination that the filepath is included in the plurality of filepaths.

The foregoing systems also can have one, some, or all of the following features as well as other features described herein. The one or more computer readable storage devices can be configured to store a distribution of n-grams for filepaths associated with a domain name having a rank indicating that the domain name is associated with a amount of Internet traffic. The one or more computer readable storage devices can be configured to store a second distribution of n-grams for filepaths associated with the domain name. The one or more hardware computer processors further can be configured to execute the one or more software modules in order to cause the computer system to compare the expected distribution of n-grams to the actual distribution of n-grams. The factors can comprise a variance between the distributions.

The foregoing systems also can have one, some, or all of the following features as well as other features described herein. The network connection can be configured to access, from a remote network not within the local network, an Internet search engine providing an autocomplete function that automatically displays words to complete a query entered into the search engine. The network connection can be configured to receive from the remote network the words suggested by the autocomplete function. The one or more computer readable storage devices can be configured to store a list of words associated with malicious software. The one or more hardware computer processors further can be configured to execute the one or more software modules in order to cause the computer system to transmit to the Internet search engine a query comprising a domain name associated with a URL. The one or more hardware computer processors further can be configured to execute the one or more software modules in order to cause the computer system to receive words displayed by the search engine in response to the query. The factors can comprise the received words that are also included in the list of words.

The foregoing systems also can have one, some, or all of the following features as well as other features described herein. The network connection can be configured to access, from a remote network not within the local network, an Internet service providing WHOIS and/or DNS registration data to receive from the remote network domain registration data. The one or more hardware computer processors further can be configured to execute the one or more software modules in order to cause the computer system to transmit to the Internet search engine a query comprising a domain name associated with a URL. The one or more hardware computer processors further can be configured to execute the one or more software modules in order to cause the computer system to receive a domain registration date in response to the query. The factors can comprise the received domain registration date.

The foregoing systems also can have one, some, or all of the following features as well as other features described herein. The score can be based on a Support Vector Machine model, a Neural Network model, a Decision Tree model, a Naïve Bayes model, or a Logistic Regression model.

BRIEF DESCRIPTION OF THE DRAWINGS

A general architecture that implements the various features of the disclosed systems, methods, and media will now be described with reference to the drawings. The drawings and the associated descriptions are provided to illustrate embodiments and not to limit the scope of the disclosure. For instance, the flow charts described herein do not imply a fixed order to the steps, and embodiments of may be practiced in any order that is practicable.

FIG. 9B is the result of an example domain WHOIS query and network WHOIS query for the first domain name.

FIGS. 11A-11C illustrate example user interfaces of the malicious software detection system and aspects thereof.

Figure 1:
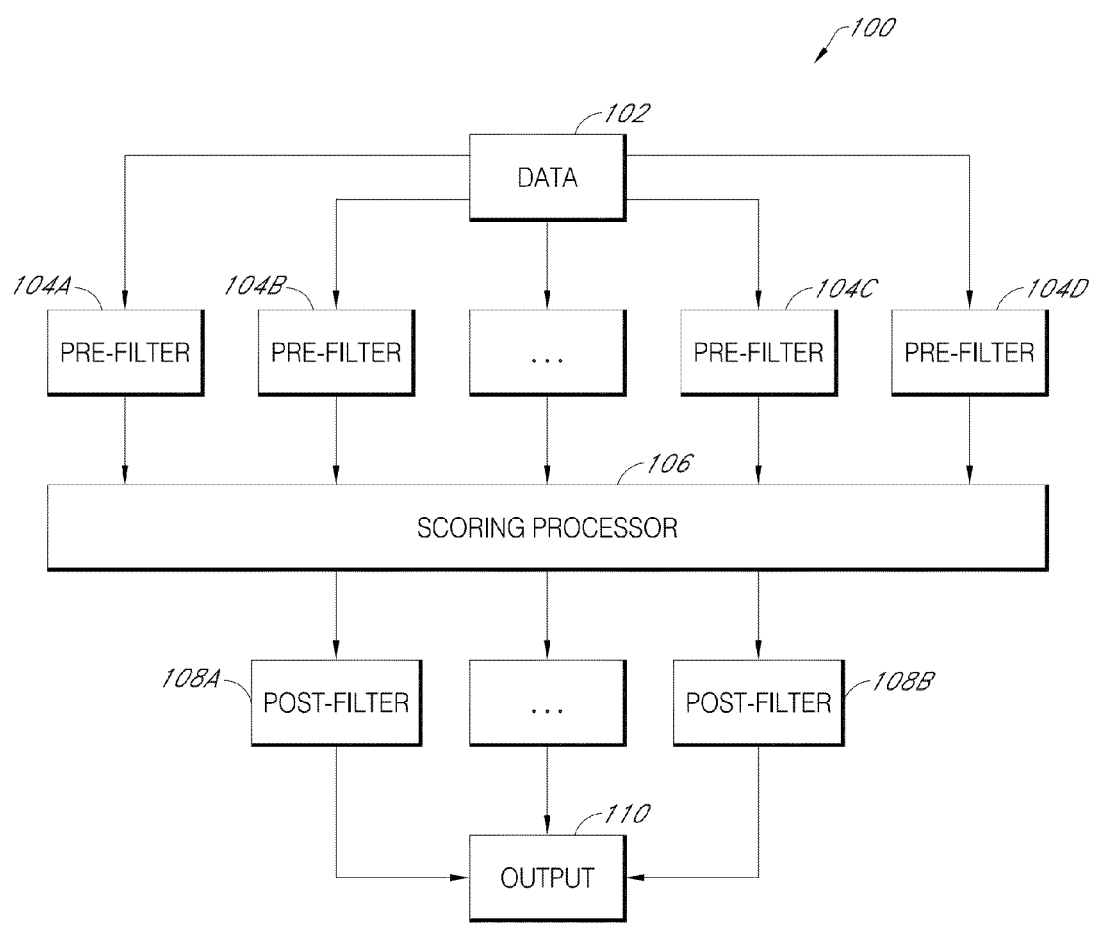
FIG. 1 provides an example overview of at least one embodiment of the system.

In the drawings, the first one or two digits of each reference number typically indicate the figure in which the element first appears. Throughout the drawings, reference numbers may be reused to indicate correspondence between referenced elements. Nevertheless, use of different numbers does not necessarily indicate a lack of correspondence between elements. And, conversely, reuse of a number does not necessarily indicate that the elements are the same.

DETAILED DESCRIPTION

This disclosure relates to computing systems for detecting activities that are indicative of cyber threats, such as beaconing activities, phishing activities, denial of service (DOS) activities, and/or other malicious software execution. As used herein, "malicious software" refers to unwanted software, such as software that causes an internal resource within a local network to transmit data and/or communicate with an external resource, e.g., outside the local network, without authorization by a user or administrator of the internal resource. For example, a computing system can identify malicious URL data items from a large plurality of unscreened data items that have not been previously identified as associated with malicious URLs, such as in a proxy log. As used herein, "malicious URL" refers to a character string including alphabetic, numeric, and punctuation characters transmitted by an internal resource within a local network. The term "external resource" is a broad term and is to be given its ordinary and customary meaning to a person of ordinary skill in the art (i.e., it is not to be limited to a special or customized meaning) and includes, without limitation, physical and virtual computers, networks, servers, machines, and cloud computing resources.

Figure 12:
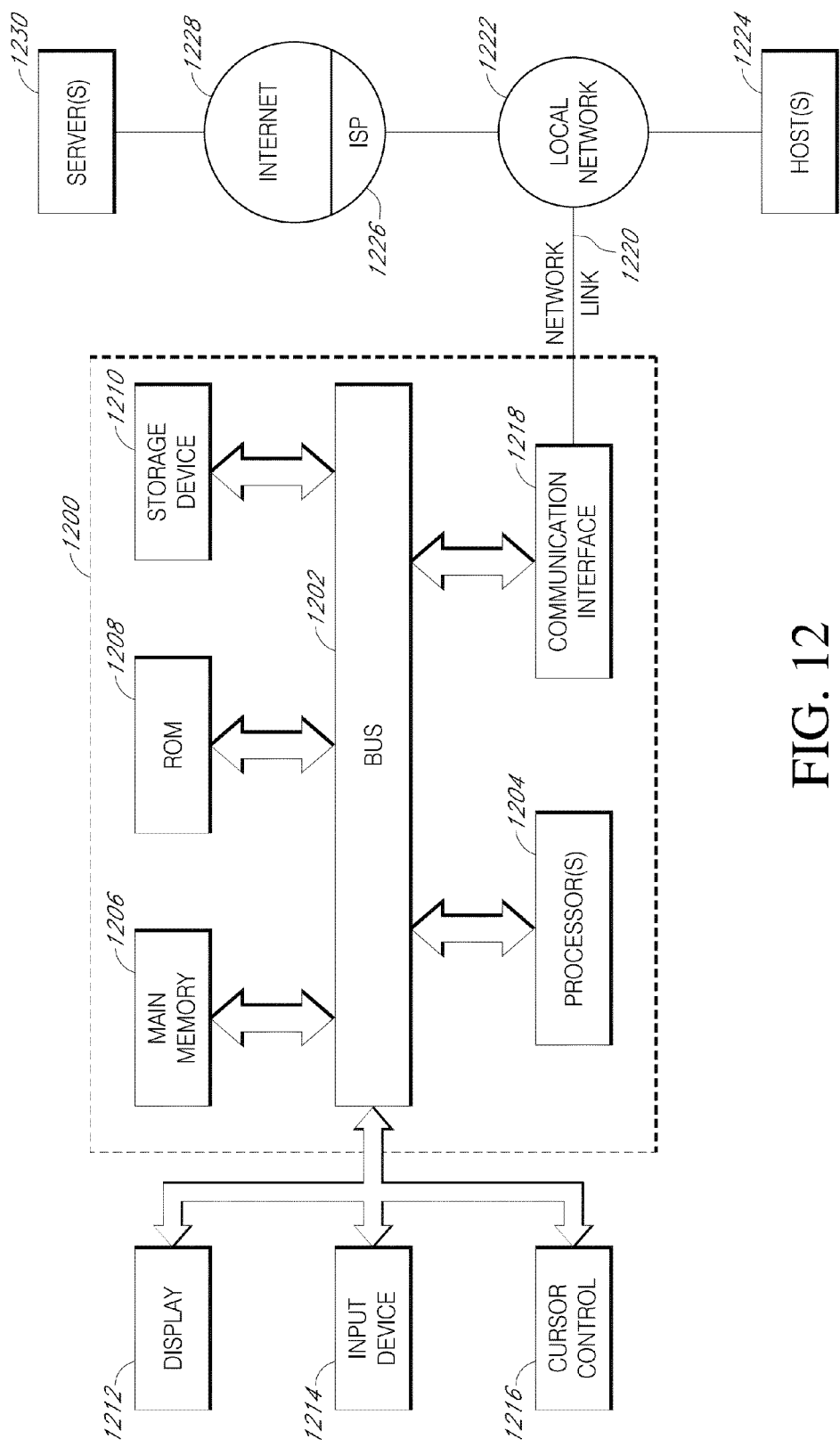
FIG. 12 illustrates a computer system with which certain methods discussed herein may be implemented.

In general, and as discussed in greater detail in relation to FIG. 12, such a computing system can include one or more computer readable storage devices, one or more software modules including computer executable instructions, a network connection, and one or more hardware computer processors in communication with the one or more computer readable storage devices.

System Structure

FIG. 1 provides an example overview of at least one embodiment of the system 100. Desirably, suitable program instructions stored on a non-transitory computer readable storage medium are executed by a computer processor in order to cause the computing system of FIG. 12 to perform some or all of the processes indicated in FIG. 1, such as to access an outbound data connection log 102 for a local network, such as a proxy log, from a server.

The outbound data connection log 102 includes a large plurality of data items, such as thousands, millions, tens of millions, hundreds of millions, or even billions of data items. In one embodiment, such data items include the IP addresses of internal resources, within the local network, that have attempted to communicate with an external resource outside the local network. The outbound data connection log 102 can also include a time, such as a time stamp indicating year, month, day, hour, minute, and/or second, associated with each attempted connection. The outbound data connection log 102 can also include a character string relating to the attempted connection. An example character string may be a URL. Such a URL can generally resemble the form: schm:// 3LD.2LD.TLD/filepath. The portion "schm" represents the scheme or prefix, such as ftp, http, mailto, and the like. The portion "3LD" is a combination of alphabetic characters, numbers, and/or hyphens representing the third level domain. The portion "2LD" is a combination of alphabetic characters, numbers, and/or hyphens representing the second level domain. The portion "TLD" represents the top level domain, such as com, org, edu, gov, and the like. The portion "filepath" is a textual string that can include numeric, alphabetic, and punctuation characters such as backslashes, hyphens, question marks, periods, and the like. As used herein, and unless specified otherwise, the term "domain name" refers to the combination of the 2LD and the TLD. An example domain name has the form example.com.

Suitable program instructions are also executed by a computer processor in order to cause the computing system of FIG. 12 to execute one or more pre-filters 104A, 104B, 104C, 104D on the data items of the outbound data connection log 102 to identify a first subset of data items as possibly malicious URLs, e.g., URLs that are potentially associated with a cyber threat. In the example of FIG. 1, the pre-filters are shown in parallel. In other words, each pre-filter can filter the data items of the outbound data connection log 102 and pass a subset of data items to the scoring processor. Nevertheless, it should be understood that pre-filters can also be executed in series. For example, a first pre-filter can filter the data items of the outbound data connection log 102, and a second pre-filter can filter the first subset of data items output from the first pre-filter before passing a second subset of the first subset to the scoring processor 106. In any event, the data items identified by the pre-filter(s) are more likely to be associated with a cyber threat, such as having been transmitted in response to a command by malicious software, than items that are not identified by the pre-filter(s).

A scoring processor 106 executes a scoring process on the identified subset of data items. The scoring process can implement machine learning. The score indicates the relative likelihood that a particular data item is associated with a cyber threat, such as being transmitted in response to a command by malicious software. For example, data items with a high score can be more likely to be malicious than items with a low score, or vice versa.

Optionally, suitable program instructions stored on a non-transitory computer readable storage medium can be executed by a computer processor in order to cause the computing system of FIG. 12 to run one or more post-filters 108A, 108B on one or more of the scored data items returned from the scoring processor 106. The post-filters can identify a subset of data items from the scored data items as likely malicious URLs. Again, the post-filters can be executed in series or in parallel. The post-filters can be processed without any intervention by a human analyst or in response to specific commands by a human analyst. In any event, the data items output from the post-filter are likely to be associated with malicious software.

An output group of data items from the subset of the post-filters 108A, 108B is then passed to output 110. If post-filtering is not performed the scored data items, the scored data items from scoring processor 106 can be passed to output 110. The output 110 can be used, for example, to alert system administrators when a computer is likely to be infected with malicious software. The output 110 can also be used to improve as feedback for improving the scoring process.

Timing Pre-Filter

An optional pre-filter of the one or more pre-filters 104A, 104B, 104C, 104D is a timing pre-filter. When implemented in the foregoing system 100 of FIG. 1, the timing pre-filter can be used alone or in combination with other pre-filters. In certain embodiments, the timing pre-filter can be omitted.

As explained above, if a computing system becomes infected by malicious software, the computing system may attempt to connect to an external resource outside the local network by transmitting a malicious URL (or a group of such URLs) at some regular interval. Ordinarily, these malicious URLs are sent during a time of the computing system is likely to be used (such as during the work day), in order to camouflage the unwanted connection attempt among ordinary network traffic. Certain embodiments include the inventive realization that a system can identify possibly malicious URLs transmitted by a computing system by inferring whether a user is actively using the computer system. If the computing system attempted to connect to a particular external resource when the user was not inferred to be actively using the computer system, the external resource is more likely to be malicious. The external resource is even more likely to be malicious when the external resource is not inferred to be benign. As used here, benign refers to external resources providing safe or wanted connections or services.

There are a number of methods for inferring whether a user is actively using a computing system. An example method is discussed with reference to FIG. 2. As shown in block 202, suitable program instructions stored on a non-transitory computer readable storage medium are executed by a computer processor in order to cause the computing system of FIG. 12 to access a data log (such as outbound data connection log 102 of FIG. 1) including a large plurality of unscreened data items. Network communications and/or data traffic information between local and external resources may be captured in such a data connection log 102. Various items of information may be captured including, for example, the URLs transmitted from the local network, the local IP addresses transmitting the URLs, the times of transmission, and the like. These items of information may be captured by, for example, a network traffic router that connects the internal and external networks to one another. The network traffic router may, for example, log such items of information such that they may be read and analyzed by the timing pre-filter system. Alternatively, the network traffic may be captured by, for example, other types of computerized sensors. Each of the above described items of information may be a data item in the context of the timing pre-filter system.

The local IP addresses, URLs, and times can be logically associated as connection records indicating a particular communication from a particular computerized device to a particular external resource at a particular time, such that each of the connection records is associated with a particular device identifier, a particular URL, and a particular time.

Figure 2A:
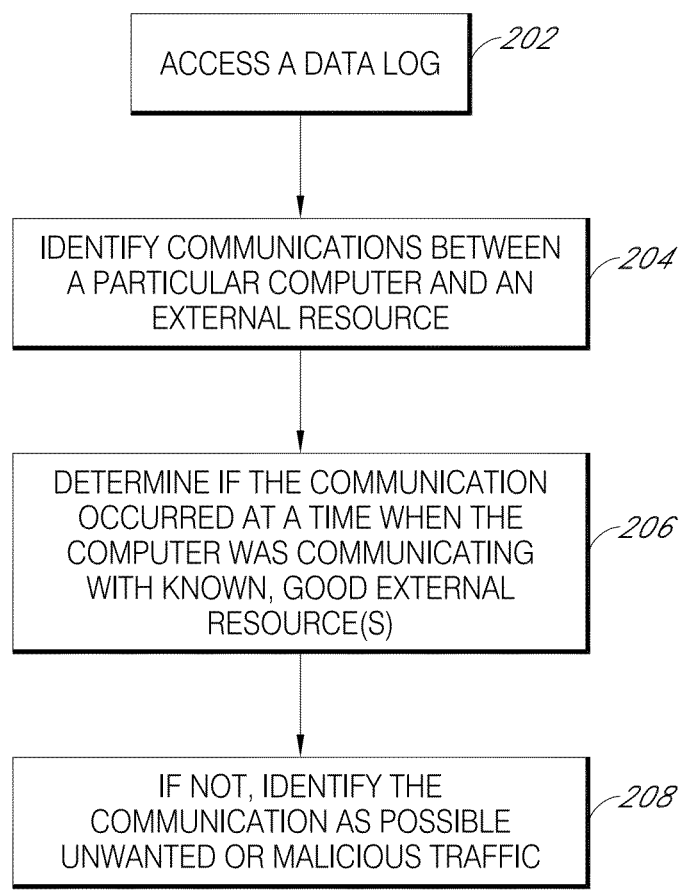
FIG. 2A is a flowchart of an example time-based method for inferring whether a user is actively using a computing system.

As shown in block 204 of FIG. 2, the system can execute software for identifying communications between a particular computer and an external resource. For example, the software can identify, from the plurality of connection records, one or more first connection records having a common device identifier (e.g., a common IP address).

According to block 206, the system can execute suitable program instructions for determining if the communication occurred at a time when the computer was communicating with known, good external resource(s). In this regard, the connection records can be limited to those connection records occurring within a certain period of time (e.g., a 1 minute block, a 5 minute block, a 15 minute block, an hour block etc.). Each of the identified connection records will have an associated URL. The system can parse the one or more URLs for one or more domain names, such that each of the one or more URLs is associated with a particular first domain name. Suitable parsing techniques are known in the art and include regular expression matching. A network connection of the system accesses, from a remote network not within the local network, a list of domain names satisfying a ranking condition based on Internet traffic data. Example networks and lists include the "top websites" ranking provided by Alexa Internet, Inc. and the Google Display Network Ad Planner ranking provided by Google, Inc. In a non-limiting embodiment, the program instructions can allow the system to evaluate whether a particular connection occurred during a period of time when a particular device identifier (such as an IP address) also transmitted a URL to a domain name within the top 10,000 Alexa traffic rank. Suitable ranking conditions include, but are not limited to, inclusion in the Alexa traffic rank or Google Display Network Ad Planner, or inclusion above a particular position in the Alexa traffic rank or Google Display Network Ad Planner. For example, a domain name may appear in the top-10,000 Alexa traffic rank or the top-1,000 Alexa traffic rank.

Referring next to block 208, if a particular communication did not occur at a time when the computer was communicating with ranked external resources, the system software can designate the associated URL as a possibly malicious URL data item.

The designated URL (along with other URLs similarly identified) can then be passed to the scoring processor 106 of FIG. 1, which as discussed below can assign a score to the URL based on a plurality of factors. In this way, the timing pre-filter can improve processing speed by reducing the number of data items passed to the scoring processor. It should be understood that the foregoing method represents an example technique for inferring whether a user is actively using a computing system. Other techniques can include evaluating email activity, keystrokes, batch records, and so forth.

Figure 2B:
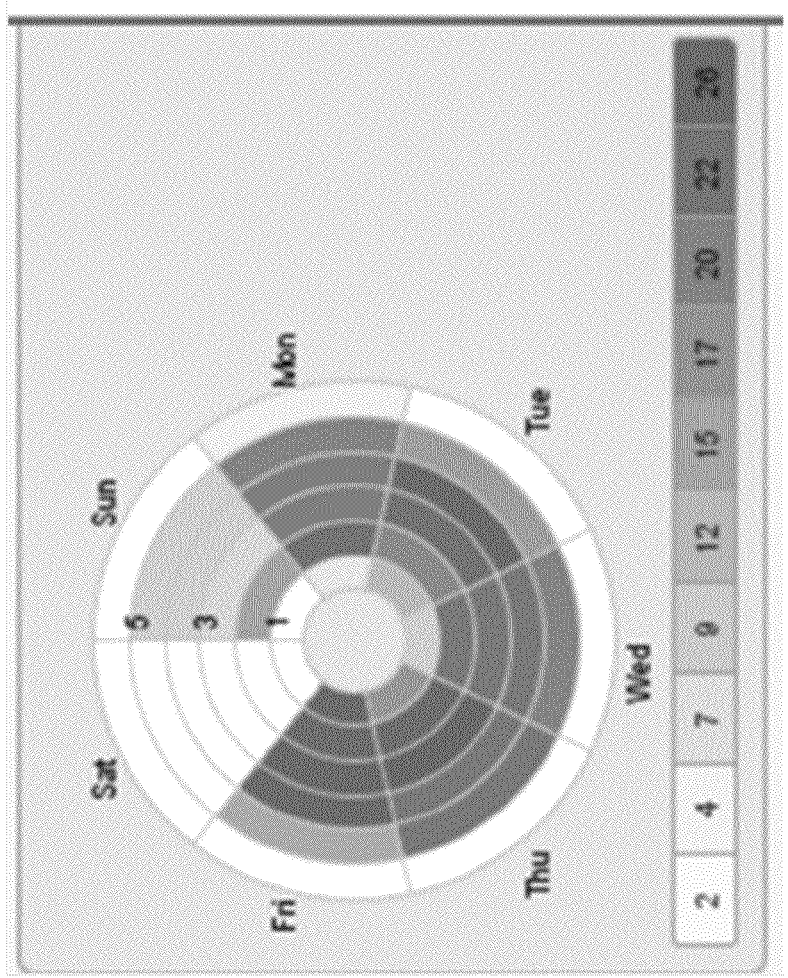
FIG. 2B illustrates a sample visualization of outgoing network traffic, such as requests for external URLs from a particular computing system or group of computing systems.

FIG. 2B represents visualization of certain calls out to a network resource. An analyst can view the visualization in order to determine whether possible malicious activity actually is malicious activity. The example graphical timeline shows all traffic to a specific domain or range of IP addresses. If there are many requests out to that domain at about the same time each day (or some pattern of days), especially of those times are ones that the user is typically not at the computer, the traffic is more likely to be caused by malicious malware.

Beaconing Malware Pre-Filter

An optional pre-filter of the one or more pre-filters 104A, 104B, 104C, 104D is a beaconing malware pre-filter. When implemented in the foregoing system 100 of FIG. 1, the beaconing malware pre-filter can be used alone or in combination with other pre-filters. In certain embodiments, the beaconing malware pre-filter can be omitted.

FIGS. 3A-3E relate to the beaconing malware pre-filter. Beaconing malware is an example of malicious software. Beaconing malware activity may include, for example, a software program maliciously installed on a target ("infected") computer system that periodically attempts to transmit data and/or communicate with a remote computer system. Typically, beaconing malware may attempt connections on a regular, well-defined, and periodic basis, where the time between attempts is on the order of hours, days, weeks, or months. Such a malicious software program may be dormant (with the exception of beaconing activity) for a period of time before it is activated by the remote computer system. Once activated, the malicious software program may perform various malicious actions including, for example, transmitting uniform resource locator (URL) data items, accessing, modifying, and/or deleting files; extracting personal data and information; obtaining passwords and usernames; and the like. Beaconing malware detection is also described in greater detail in U.S. Pat. No. 8,788,407, issued Jul. 22, 2014, which is incorporated herein by reference in its entirety. A beaconing malware pre-filter system may be used to detect beaconing malware, as described below.

According to various embodiments, beaconing malware-related data entity seeds (referred to herein as "beaconing seeds") may be generated by the system as described below in reference to FIG. 3A. Each of these beaconing seeds may include pairs of beaconing entities (referred to a "beaconing pairs"), such as a beacon originator and a beacon recipient, and the seeds may be generated based on a likelihood that the seeds represent beaconing activities and/or data. Each of the seeds may be used as a basis for clustering various other beaconing malware-related entities, as described in reference to FIGS. 3B and 3D. Accordingly, the generated clusters may represent various data entities that are all related to potential beaconing malware-related activity. Each of the generated clusters may then be scored according to various criteria (or rules), as described below in reference to FIG. 3C. The various scores and metascores generated by the system provide indications regarding the likelihood that the cluster includes entities representing beaconing activities and/or data. Accordingly, based on the various score and metascores, a cluster that is more likely to be associated with beaconing malware can be passed to the scoring processor of FIG. 1. In this way, the beaconing malware pre-filter can improve processing speed by reducing the number of data items passed to the scoring processor.

In an embodiment, and as described below, the beaconing malware pre-filter system may be used in a network environment in which an internal network is in communication with an external network. The system may be used to determine whether any computer systems of the internal network have been infected by beaconing malware that is communicating with computer systems of the external network. Various computerized devices may be included in the internal network that may be capable to capturing and/or logging data traffic between the internal network and the external network including, for example, network routers and/or switches.

Beaconing Malware Pre-Filter: Seed Generation

Figure 3A:
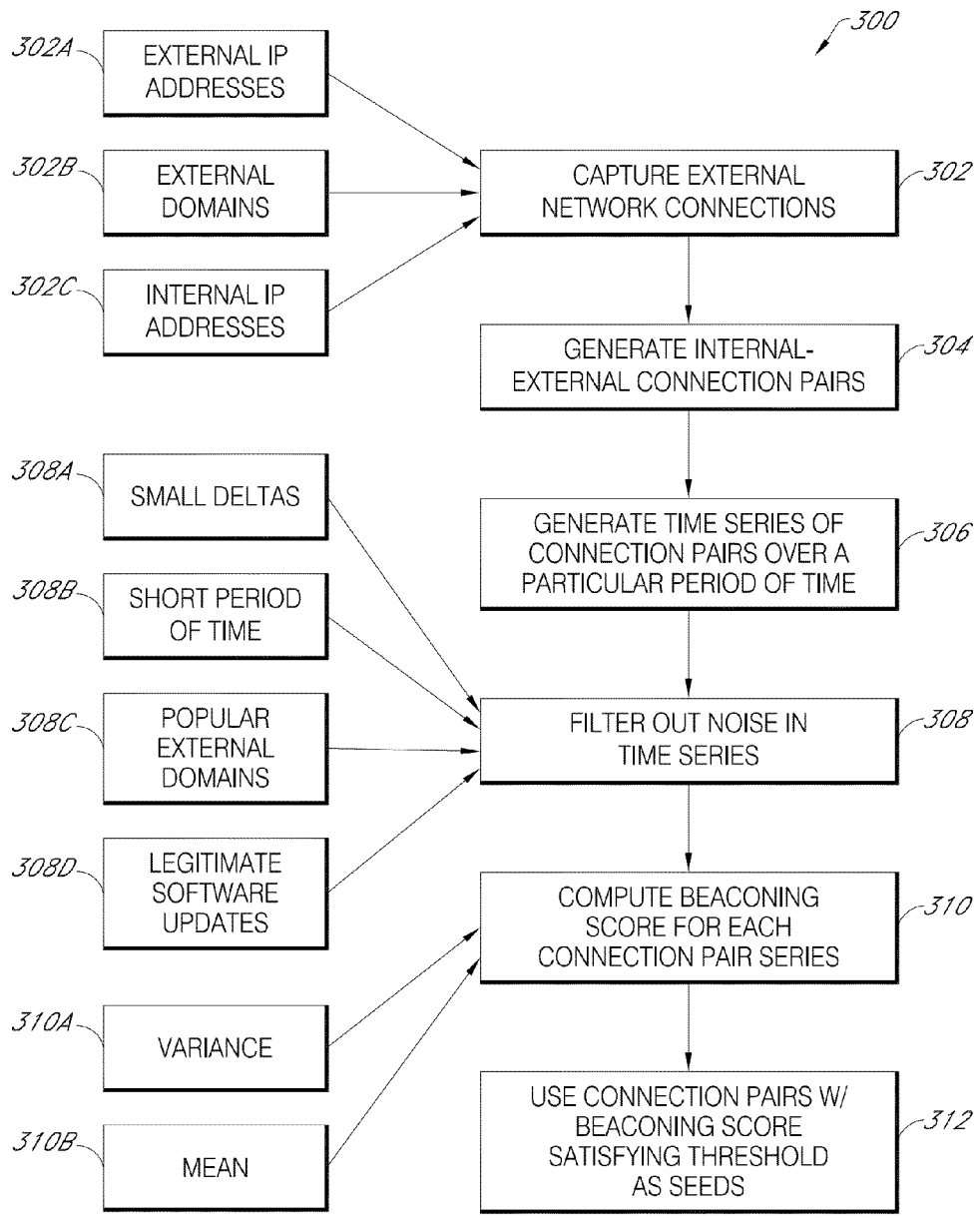
FIG. 3A is a flowchart of an example of a seed generation method as applied to beaconing malware detection.

FIG. 3A is a flowchart of an example of a seed generation method 310A of the beaconing malware pre-filter system as applied to beaconing malware detection, according to various embodiments of the present disclosure. The seed generation method 310B may generally be understood to correspond to block 310 (seed generation) of the generalized process of FIG. 3.

Referring to FIG. 3A, at block 312, network communications and/or data traffic information between the internal and external networks may be captured by the beaconing malware pre-filter system. Various items of information may be captured including, for example, external IP addresses contacted (312A), external domains contacted (312B), internal IP addresses contacting the external IP addresses and domains (312C), and the like. These items of information may be captured by, for example, a network traffic router that connects the internal and external networks to one another. The network traffic router may, for example, log such items of information such that they may be read and analyzed by the beaconing malware pre-filter system. Alternatively, the network traffic may be captured by, for example, other types of computerized sensors. Each of the above described items of information may be a data entity in the context of the beaconing malware pre-filter system.

At block 313, the system may generate internal-external connection pairs. Each of the internal-external connection pairs may include a particular internal IP address and a particular external IP address and/or domain that was contacted by the internal IP address. At block 314, time series of the generated internal-external connection pairs may be generated. For example, the system may determine sets of connection pairs that have common internal IP addresses and external IP addresses or domains. Then, for each set, a time series may be generated that represents each point in time that the same or a similar connection is made between a particular internal IP address and external IP address or domains. Each of the time series may span a particular time period. For example, each time series may span a number of days, weeks, months, or years. Thus, a connection pair time-series (or simply "connection pair series" or "connection series"), may indicate multiple connections made between a particular internal and external IP address (or domain or other device identifier) and/or a periodicity or other pattern indicating when the connections were made. The internal-external connection pairs may be plotted along each time series for the particular time period.

At block 316, the beaconing malware pre-filter system may filter out any noise in each time series. For example, the connection pairs in each connection series may be analyzed in order to identify any connection pairs of the particular connection series that should be indicated as noise. Noise in a connection series may include, for example, any internal-external connection pairs that have a low likelihood of being related to beaconing activity and/or to malicious activity. Various filter criteria may be applied to filter out noise. Examples of noise filtering criteria may include, but are not limited to: filter 316A, which detects frequently established connections, such as the same or similar connection pairs (for example, multiple connection pairs from the same internal IP to the same external IP and/or domain) that occur with short intervals (or deltas) of time between them (for example, intervals on the order of seconds, or intervals that are shorter than are typically employed by beaconing malware); filter 316B, which detects connection pairs that have only been occurring for a short period of time (for example, for a week or less); filter 316C, which detects connection pairs with popular or well-known legitimate external domains (for example, a third-party produced list of popular domains may be used by the system); and/or filter 316D, which detects connection pairs made by legitimate software for, for example, software updates (in an embodiment, this filter criteria may be applied on a per-computer system basis, such that a determination may be made regarding the legitimacy of particular pieces of software on each individual computer system).

Once connection pairs that include noise, or which are not likely related to beaconing malware, are filtered from each connection series, at block 317 a beaconing score may be computed for each connection pair series. A beaconing score may be computed in any of various ways. One example of computing a beaconing score is shown in block 317A. In the example of block 317A, the system may calculate a variance of the particular connection pair series. The variance may, for example, provide an indication of the regularity, or periodicity, of the connection pairs over time. Higher variances may indicate that the connection pair is less likely to be related to malware beaconing activity, as malware beaconing activity may generally occur at very regular intervals. Thus, lower variances may indicate that the connection pair is more likely to be related to malware beaconing activity. Another example of computing a beaconing score is shown in block 317B. In the example of block 317B, the system may calculate a mean of the particular connection pair series. The mean may, for example, provide an indication of the average time between each connection pair over time. Particular mean values, for example, a particular number of days, weeks, and/or months, may indicate higher or lower likelihood that the connection series is related to malware beaconing activity. In another example, some combination of a variance and a mean of a connection pair series may be used by the system as a beaconing score (for example, a variance divided or normalized by a mean or a mean squared). In an embodiment, the variance is calculated based on an average of squared differences from the mean time between connections in a time series.

At block 318, the system may determine which connection pairs have beaconing scores that satisfy a particular threshold. For example, the system may determine that any beaconing pairs having beaconing scores below a particular variance are likely to represent malware beaconing activity. Accordingly, the beaconing malware pre-filter system may designate and use those connection pairs as seeds. Thus, the method 310B may be used to generate seeds including a connection pair (e.g., an internal IP address and an external IP address or domain) that may be used by the beaconing malware pre-filter system in a beaconing malware detection application.

Beaconing Malware Pre-Filter: Cluster Generation

Figure 3B:
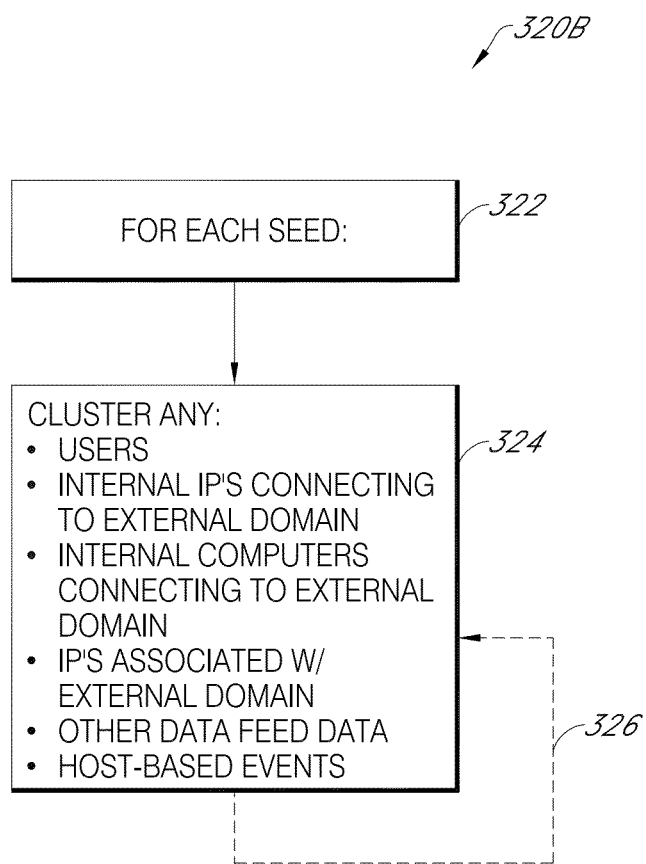
FIG. 3B is a flowchart of an example of a clustering method as applied to beaconing malware detection.

Turning now to FIG. 3B, a flowchart of an example of a clustering method 320B of the beaconing malware pre-filter system as applied to beaconing malware detection is shown, according to various embodiments of the present disclosure. The clustering method 320B may generally be understood to correspond to block 320 (cluster generation) of the generalized process of FIG. 3. Additionally, the clustering method 320B may correspond to a clustering strategy, as described above. In the flowchart of FIG. 3B, block 322 indicates that the following block (324) may be performed for each of the seeds generated by the seed generation method 310B of FIG. 3A.

At block 324, any data entities that are related to the seed may be clustered. Clustering of data entities may be accomplished as generally described above, in which data bindings are executed and/or searching and filtering are performed (through, for example, a generic interface to various data sources) as part of a clustering strategy. Additionally, as described above, clustered data entities may be related by, for example, sharing the same or similar properties, characteristics, and/or metadata. Examples of data entities that may be clustered include, but are not limited to: users (for example, persons having accounts on particular computer systems), internal IP addresses, internal IP addresses that connect to external domains, internal computer systems, internal computer systems that connect to external domains, external IP addresses, external domains, external IP addresses associated with external domains, other data feed data entities (for example, data entities drawn from public and/or private whitelists or blacklists, such as data entities representing known bad domains, known good domains, known bad IP addresses, and the like), host-based events (such as, for example, virus scan alerts and/or logged events, intrusion prevention system alerts and/or logged events, and the like), and the like.

Figure 3C:
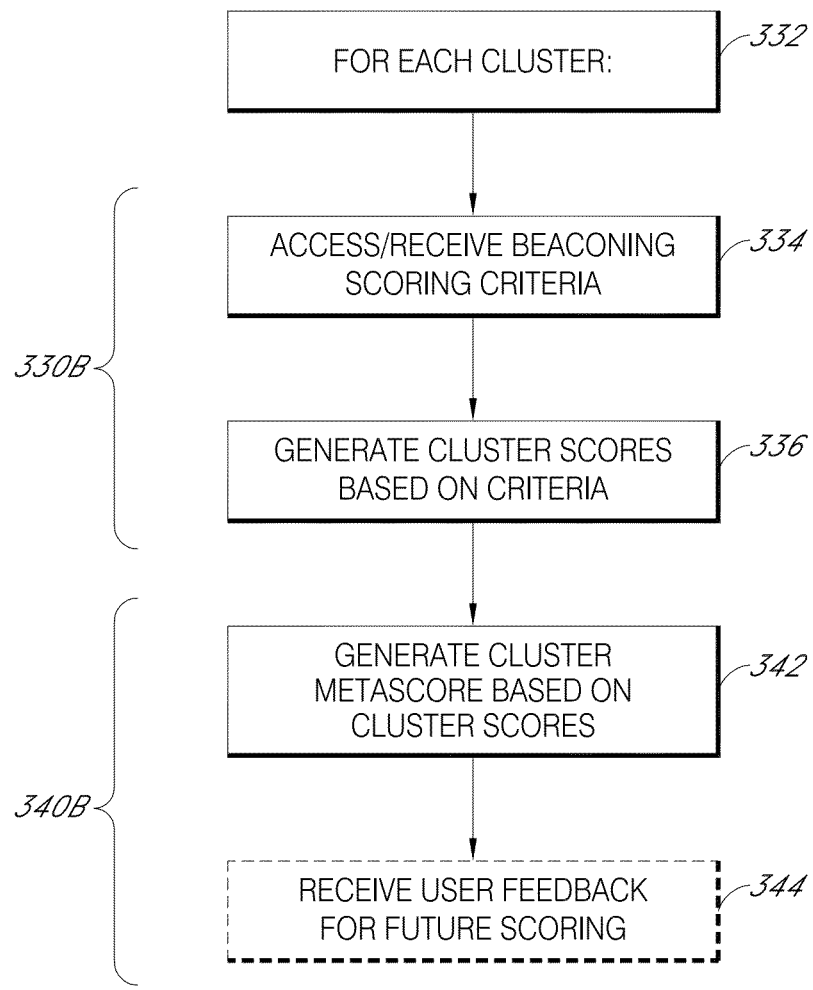
FIG. 3C is a flowchart of example cluster scoring methods as applied to beaconing malware detection.
Figure 3D:
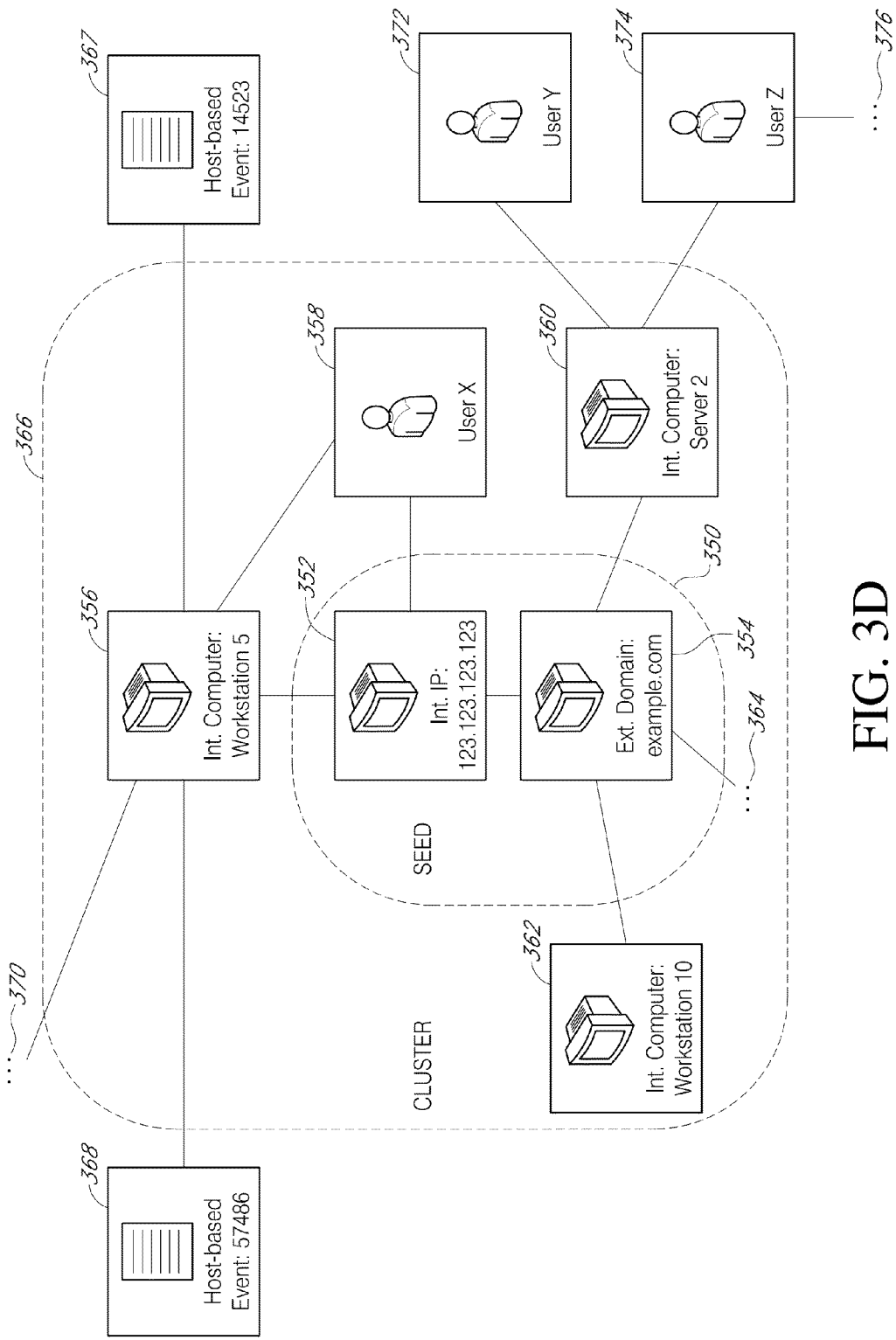
FIG. 3D illustrates a portion of an example cluster of related data entities in a beaconing malware detection application.

FIG. 3D illustrates an example growth of a cluster of related data entities in a beaconing malware detection application, according to an embodiment of the present disclosure. In FIG. 3D, boxes indicate data entities, while lines between boxes indicate links that connect data entities. As described above, seeds in the described beaconing-malware detection application of the beaconing malware pre-filter system may be connection pairs. As shown in the example of FIG. 3D, a seed connection pair has been generated (such as by the process of FIG. 3A) that includes an internal IP address 352 and an external domain 354, as indicated visually by the internal seed dashed line 350. Then, in a clustering step corresponding to block 324 (of FIG. 3B) and represented by the external cluster dashed line 366, various other data entities related to the seed data entities may be added to the cluster. For example, the beaconing malware pre-filter system has clustered an internal computer system 356 (that may be associated with the internal IP address 352), a user 358 (who may be a user of the computer system 356 at the internal IP address 352), and two other computer systems 360 and 362 that have each also connected to the external domain 354.

Returning again to FIG. 3B, dashed line 326 indicates that the cluster generation method may optionally repeat multiple times until, for example, the clustering strategy is completed and/or no additional related data entities are found by the system. For example, in reference to FIG. 3D, additional data entities may be clustered including host-based events 367 and 368 associated with the computer system 356, and users 372 and 374 of the computer system 360. As indicated by ellipses 364, 370 and 376, additional data entities may be clustered in subsequent clustering steps. Further, referring to FIG. 3B, and as described above, at 326 various clusters of data entities may optionally be merged and/or collapsed when common data entities and/or properties are determined between the various clusters. For example, the system may determine that two different generated clusters both include user 358. Accordingly, the system may merge the two clusters each including the common data entity (user 358) into a single cluster. Accordingly, in an embodiment the clustering method 320B may iteratively cluster related data entities.

In an embodiment, the various clustered data entities may include various properties and characteristics, including information regarding data communications and requests between internal and external computer systems. For example, a given connection pair (or seed) may represent multiple connections over a period of time (as described above in reference to FIG. 3A). Accordingly, various information related to the connections, including request sizes, may be included in the data cluster.

Beaconing Malware Pre-Filter: Cluster Scoring

Turning now to FIG. 3C, a flowchart of example cluster scoring methods 330B, 340B of the beaconing malware pre-filter system as applied to beaconing malware detection is shown, according to various embodiments of the present disclosure. The clustering scoring methods 330B, 340B may generally be understood to correspond to blocks 330 and 340 (cluster score and metascore generation) of the generalized process of FIG. 3. Additionally, the clustering scoring methods 330B, 340B may correspond with scoring strategies, as described above. In the flowchart of FIG. 3C, block 332 indicates that each of the following blocks (334, 336, 342, and 344) may be performed for each of the clusters generated by the cluster generation method 320B of FIG. 3B.

At block 334, the beaconing malware pre-filter system may access and/or receive beaconing scoring criteria. The beaconing scoring criteria may include any number of rules or scoring strategies such that multiple scores may be generated for each cluster. Several non-limiting examples of beaconing scoring criteria may include: a number of external domains in the cluster known to be malicious; a number of blacklists on which an external domain in the cluster appears; a trustworthiness (and/or number) of blacklists on which external domains in the cluster appear; a number and/or severity of host-based events in the cluster (such as, for example, virus scan alerts and/or logged events, intrusion prevention system alerts and/or logged events, and the like); a number of requests and/or connections between internal and external network devices associated with the cluster that were blocked by a proxy, router, or other appliance linking the internal network to the external network; and/or an average request size (for example, an amount of data transmitted) between the internal and external devices associated with the cluster (for example, smaller request sizes may indicate a higher likelihood that the activity is related to beaconing activity).

At block 336, the beaconing scoring criteria may be applied to the clusters and cluster scores may be generated. In an embodiment, each cluster score may include an absolute value and/or a weighted value as described above in reference to FIG. 3C. Additionally, as described above, the system may normalize the absolute values of each of the scores before applying a relative weighting to arrive at a weighted value. Examples of cluster scores presented to an analyst or other user of the beaconing malware pre-filter system are shown and described below in reference to FIG. 3E.

At block 342, a metascore may be generated for the clusters. The cluster metascore may be based on a combination or aggregation of the individual scores generated in block 336. Alternatively, the metascores may be separately determined scores. In an embodiment, a metascore may be calculated by summing, multiplying, and/or otherwise aggregating or averaging the various individual scores together. The metascore may, in an embodiment, capture the relative importance of each of the individual scores by weighting each of the individual scores in a manner similar to that described above with reference to FIG. 3C. For example, as shown "known bad domains" may be weighted more heavily than other cluster scores as a known bad domain included in a cluster is a strong indicator of malicious beaconing activity. In another example, "requests blocked by proxy" may be weighted less heavily than other cluster scores as a blocked proxy request may be an indicator of potentially malicious beaconing activity, but it may not be as strong an indicator as others.

In an embodiment, the beaconing malware pre-filter system may automatically evaluate the generated clusters to determine a likelihood that a given cluster represents beaconing malware activity. For example, the system may determine that a cluster having a metascore below a particular threshold is likely not related to beaconing malware activity, while a cluster having a metascore above another particular threshold likely is beaconing malware activity. In other words, based on the various score and metascores, a cluster that is more likely to be associated with beaconing malware can be passed to the scoring processor of FIG. 1. In this way, the beaconing malware pre-filter can improve processing speed by reducing the number of data items passed to the scoring processor.

"New" Pre-Filters

Optional pre-filters of the one or more pre-filters 104A, 104B, 104C, 104D are designated herein as "new" pre-filters. When implemented in the foregoing system 100 of FIG. 1, each of the new pre-filters can be used alone or in combination with other pre-filters. In certain embodiments, the new pre-filters can be omitted.

New Pre-Filters: New Domain Names

Figure 4A:
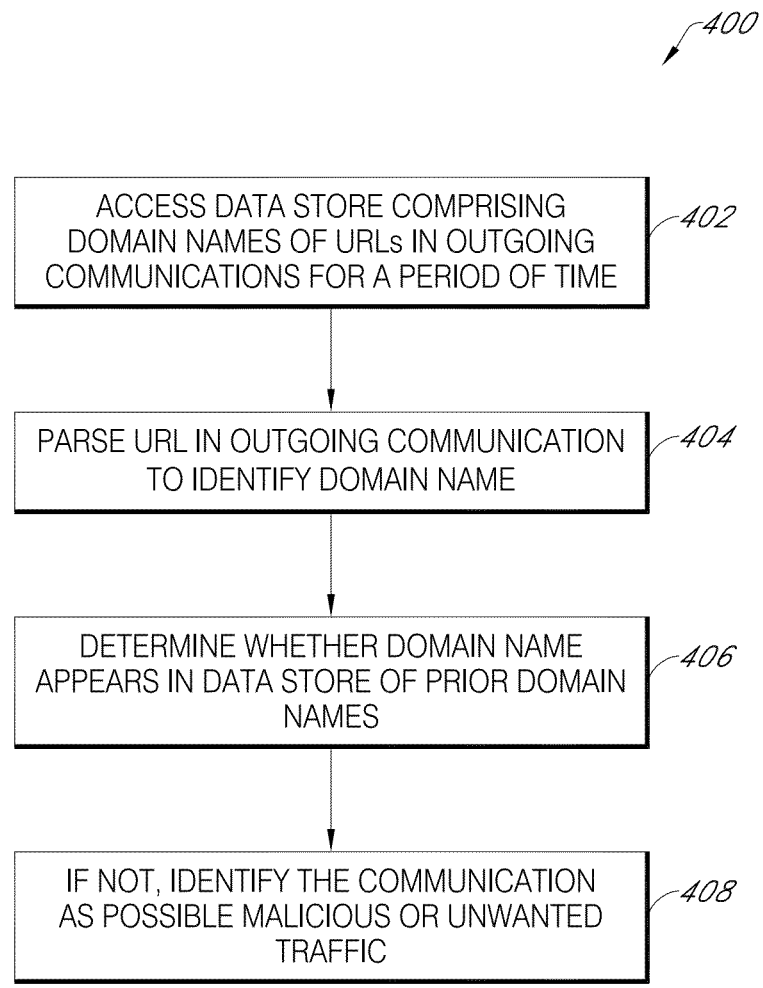
FIG. 4A is a flowchart of an example of a domain name filtering method.

FIG. 4A is a flowchart of an example of a domain name filtering method 400 of the new pre-filter system as applied to malware detection, according to various embodiments. The domain name filtering method 400 is based on the inventive realization that domain names that have never been accessed by a local network (or are accessed only rarely) are more likely to be associated with malicious software than recently accessed domain names.

As shown in block 402, suitable program instructions stored on a non-transitory computer readable storage medium are executed by a computer processor in order to cause the computing system of FIG. 12 to access a data store including the domain names accessed by the local network for a period of time, such as one month, six months, or a year. The system can also access a data log including a large plurality of unscreened data items, as discussed above with reference to FIGS. 1 and 2. The data log can include the URLs transmitted from the local network. The URLs can be parsed using an appropriate computer-implemented textual analysis technique, such as regular expression matching, to identify the domain names. In block 406, the system determines whether the identified domain names appear in the data store, e.g., by performing a relevant database query.

Referring next to block 408, if a particular communication is associated with a "new" domain name, that is, a domain name that has not been accessed by the local network for a period of time, the system software can designate the associated URL as a possibly malicious URL data item.

New Pre-Filters: New Filepath

Figure 4B:
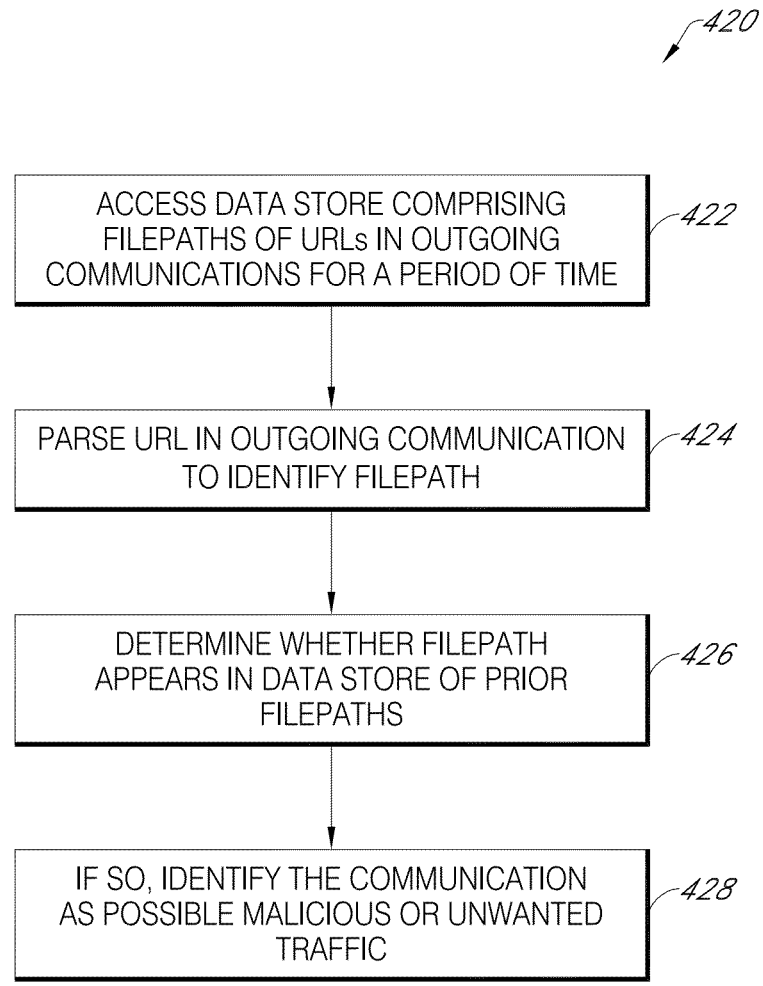
FIG. 4B is a flowchart of an example of a filepath filtering method.

FIG. 4B is a flowchart of an example of a filepath filtering method 420 of the new pre-filter system as applied to malware detection, according to various embodiments. The filepath filtering method 400 is based on the inventive realization that filepaths that have previously been accessed by a local network are more likely to be associated with malicious software than filepaths that have not been previously accessed by the local network.

As shown in block 422, suitable program instructions stored on a non-transitory computer readable storage medium are executed by a computer processor in order to cause the computing system of FIG. 12 to access a data store including the filepaths accessed by the local network for a period of time, such as the current day, the previous day, or the current week. The system can also access a data log including a large plurality of unscreened data items, as discussed above with reference to FIGS. 1 and 2. The data log can include the URLs transmitted from the local network. In block 424, the URLs are parsed using an appropriate computer-implemented textual analysis technique, such as regular expression matching, to identify the filepaths. The URLs may have different domain names or the same domain names. In block 426, the system determines whether the identified filepaths appear in the data store or are similar to filepaths in the data store, e.g., by performing a relevant database query. In certain embodiments, the system can first discard filepaths with a different number of characters, in order to reduce the number of filepaths to be analyzed. The system can then identify URLs with matching filepaths or the system can assign a similarity score (such as a percentage of matching characters, a percentage of matching n-grams, or the like).

Referring next to block 428, if a particular communication is the same as or similar to an "old" filepath, that is, a filepath that already has been accessed by the local network, the system software can designate the associated URL as a possibly malicious URL data item.

After completing the generalized processes of FIG. 4 (viz. domain name filtering method 400 and/or filepath filtering method 420), the designated URL (along with other URLs similarly identified) can then be passed to the scoring processor 106 of FIG. 1, which as discussed below can assign a score to the URL based on a plurality of factors. In this way, the new pre-filter can improve processing speed by reducing the number of data items passed to the scoring processor.

Domain Pre-Filters

Other optional pre-filters of the one or more pre-filters 104A, 104B, 104C, 104D are referred to herein as "domain" pre-filters. When implemented in the foregoing system 100 of FIG. 1, each of the domain pre-filters can be used alone or in combination with other pre-filters. In certain embodiments, the domain pre-filters can be omitted.

Domain Pre-Filters: Dictionary Filtering

Figure 5A:
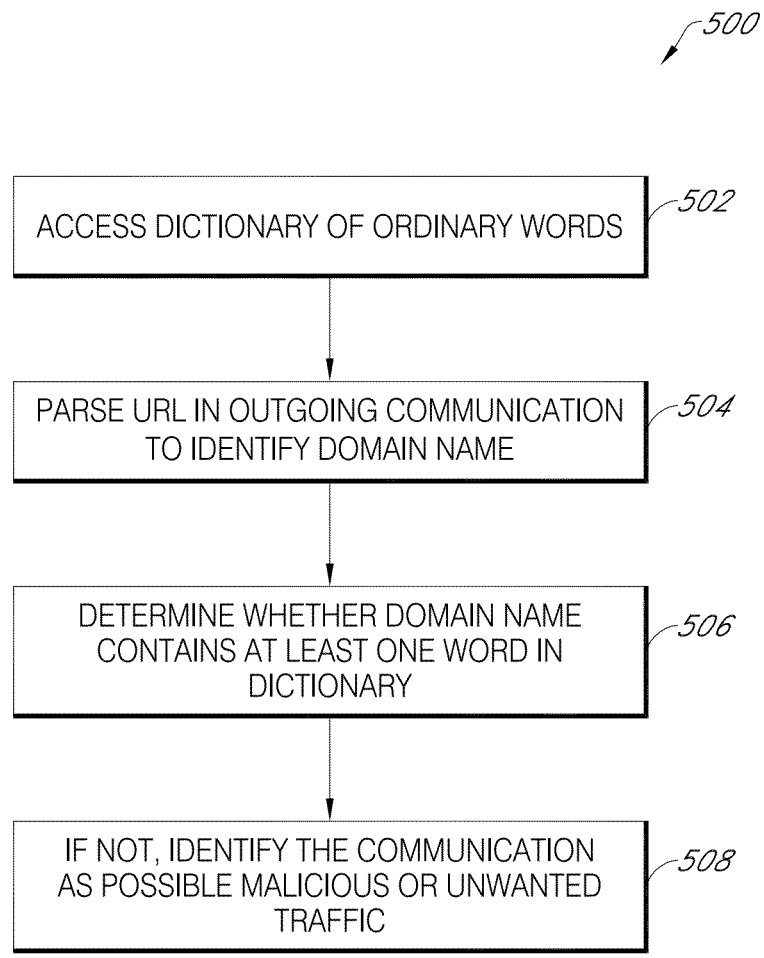
FIG. 5A is a flowchart of an example of a dictionary filtering method.

FIG. 5A is a flowchart of an example of a dictionary filtering method 500 of the domain pre-filter system as applied to malware detection, according to various embodiments. The dictionary filtering method 400 is based on the inventive realization that 2LDs that do not contain any ordinary words are more likely to be associated with malicious software than 2LDs that do.

As shown in block 502, suitable program instructions stored on a non-transitory computer readable storage medium are executed by a computer processor in order to cause the computing system of FIG. 12 to access a dictionary of ordinary words, such as an English dictionary. The system can also access a data log including a large plurality of unscreened data items, as discussed above with reference to FIGS. 1 and 2. In block 506, the system determines whether the identified 2LDs contain at least one word in the dictionary, e.g., using a rolling hash function. In certain embodiments, the system can access one or more non-English dictionaries. The system can determine whether the identified 2LDs contain at least one word in the non-English dictionary.

Referring next to block 508, if a particular communication is not associated with any dictionary words, for example, if the 2LD consists of a random string of alphabetic characters and numbers, the system software can designate the associated URL as a possibly malicious URL data item. In certain embodiments, the system software can designated an associated URL as a possibly malicious URL data item if it contains a number of non-English words.

Domain Pre-Filters: Rank Filtering

Figure 5B:
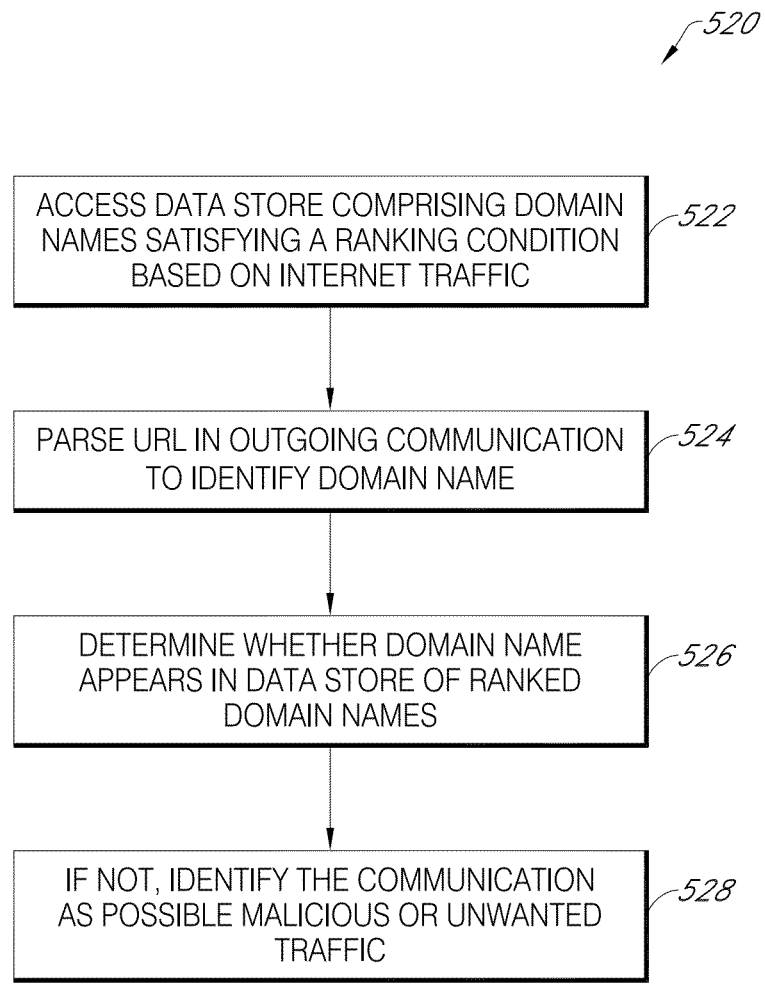
FIG. 5B is a flowchart of an example of a ranking filtering method.

FIG. 5B is a flowchart of an example of a ranking filtering method 520 of the domain pre-filter system as applied to malware detection, according to various embodiments. The ranking filtering method 520 is based on the inventive realization that domain names that do not appear in a commercial database of domain names satisfying a ranking condition based on Internet traffic data are more likely to be associated with malicious software than domain names that do.

As shown in block 522, suitable program instructions stored on a non-transitory computer readable storage medium are executed by a computer processor in order to cause the computing system of FIG. 12 to access a commercial list of domain names satisfying a ranking condition based on Internet traffic data. As explained above, example networks and lists include the "top websites" ranking provided by Alexa Internet, Inc. and the Google Display Network Ad Planner ranking provided by Google, Inc. The system can also access a data log including a large plurality of unscreened data items, as discussed above with reference to FIGS. 1 and 2. The data log can include the URLs transmitted from the local network. In block 524, the URLs can be parsed using an appropriate computer-implemented textual analysis technique, such as regular expression matching, to identify the domain names. In block 526, the system determines whether the identified domain names appear in the list or satisfy a threshold position in the list, e.g., by performing a relevant database query. Suitable threshold positions include, but are not limited to, inclusion in the Alexa traffic rank or Google Display Network Ad Planner, or inclusion above a particular position in the Alexa traffic rank or Google Display Network Ad Planner. For example, a threshold position may be the 10,000th or 1,000th place in the Alexa traffic rank.

Referring next to block 548, if a particular communication is not associated a ranked domain name or a domain name that does not meet a particular ranking threshold, the system software can designate the associated URL as a possibly malicious URL data item.

After completing the generalized processes of FIG. 5 (viz. dictionary filtering method 500 and/or ranking filtering method 520), the designated URL (along with other URLs similarly identified) can then be passed to the scoring processor 106 of FIG. 1, which as discussed below can assign a score to the URL based on a plurality of factors. In this way, the domain pre-filter can improve processing speed by reducing the number of data items passed to the scoring processor.

Byte Count Pre-Filter

Figure 6:
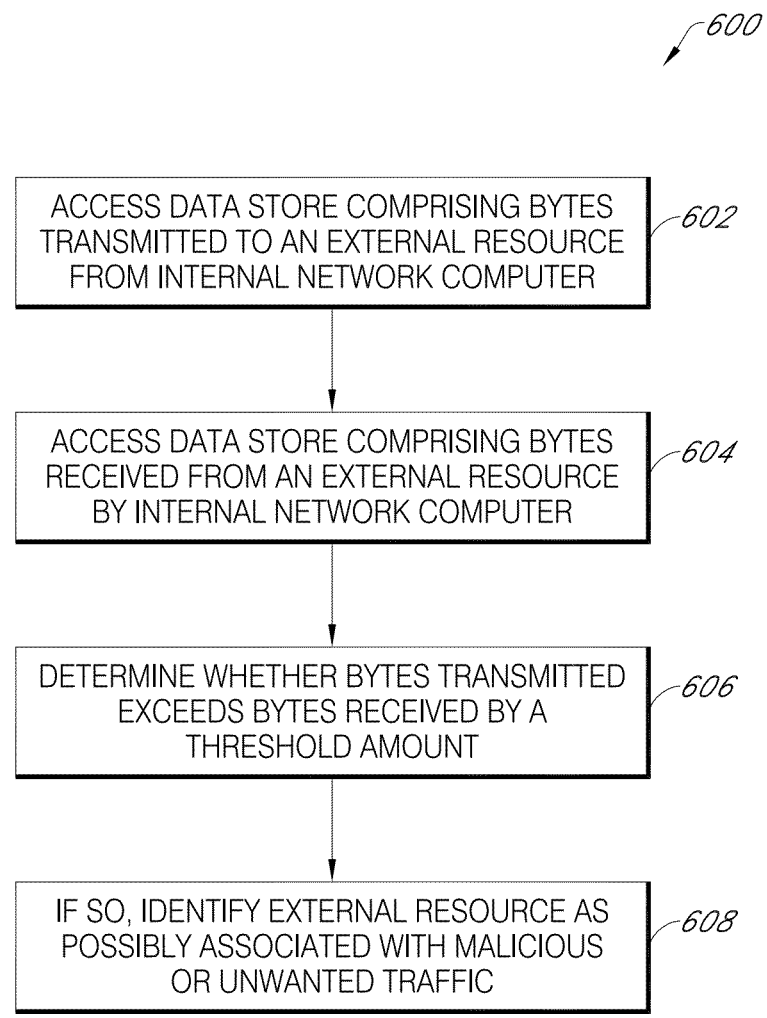
FIG. 6 is a flowchart of an example of a byte count filtering method.

An optional pre-filter of the one or more pre-filters 104A, 104B, 104C, 104D is a byte count pre-filter. When implemented in the foregoing system 100 of FIG. 1, the byte count pre-filter can be used alone or in combination with other pre-filters. In certain embodiments, the byte count pre-filter can be omitted. FIG. 6 is a flowchart of an example of a byte count filtering method 600 of a pre-filter system as applied to malware detection, according to various embodiments. The byte count filtering method 600 is based on the inventive realization that external resources that receive more bytes from the local network than they send to the local network are more likely to be associated with malicious software than external resources that send more bytes to the local network than they receive from the local network.

The designated URL (along with other URLs similarly identified) can then be passed to the scoring processor 106 of FIG. 1, which as discussed below can assign a score to the URL based on a plurality of factors. In this way, the byte count pre-filter can improve processing speed by reducing the number of data items passed to the scoring processor.

Other Pre-Filters

The foregoing pre-filters are provided by way of example. Additional pre-filters can be incorporated in various embodiments. For example, a number of vectors are described below. Any or all of such vectors can be applied as pre-filters to improve processing speed by reducing the number of data items passed to the scoring processor. Additional pre-filters include the following (which can also or alternatively be applied as vectors): URL length less than a threshold value and whether the filepath for the URL contains a particular substring, such as "cmd," that can be associated with potentially malicious URLs.

Scoring

As explained above with reference to FIG. 1, a potentially malicious URL identified by one or more pre-filter systems can be passed to scoring processor 106. The scoring processor assesses a plurality of factors or "vectors" relating to the URL and can assign a score to the URL based on a machine learning algorithm. Examples vectors are discussed in more detail below. Any of the foregoing pre-filters can also be incorporated as vectors for the machine learning algorithm. Conversely any of the vectors discussed below can also be implemented as pre-filters to reduce the number of items passed to the scoring processor.

Vector: N-Grams

An optional vector is an n-gram vector. When implemented in the foregoing scoring processor 106 of FIG. 1, the n-gram vector can be used alone or in combination with other vectors. In certain embodiments, the n-gram vector can be omitted.

Figure 7A:
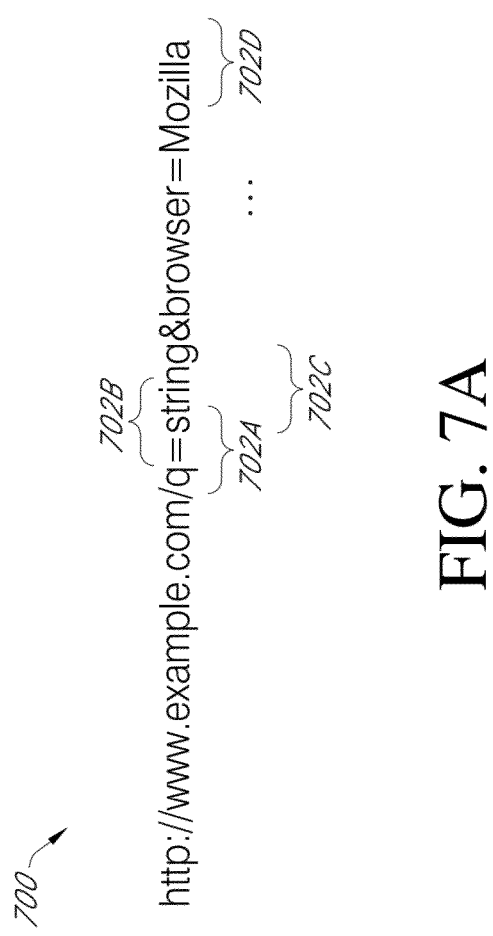
FIG. 7A shows an example URL including a filepath divided into a series of n-grams.

An n-gram is a unique sequence of N consecutive characters. URL 700 of FIG. 7A shows the filepath divided into a series of n-grams. In this example, each n-gram represents three consecutive characters. Nevertheless, other numbers of characters (such as four, five, or six) are also contemplated. N-gram 702A comprises the first three-character block of the filepath (namely, q=s). N-gram 702B comprises the second three-character block of the filepath (namely, =st). N-gram 702C comprises the third three-character block of the filepath (namely, str). The filepath is divided into a series of such three-character blocks, concluding with N-gram 702D, representing the last three-character block of the filepath (namely, IIa).

In at least one embodiment, suitable program instructions stored on a non-transitory computer readable storage medium are executed by a computer processor in order to cause the computing system of FIG. 12 to parse a potentially malicious URL to identify the domain name and filepath and detect occurrences of n-grams in the filepath by sequentially moving a fixed-length window (e.g., three characters) over the filepath and identifying the string values at each window position. After processing a particular URL, the system can update data storage associated with the domain name to include the values and counts of n-grams so identified. For example, the data storage associated with example.com can be incremented 1 count for the n-gram "q=s," 1 count for the n-gram "=st," 1 count for the n-gram "str," and one count for the n-gram "IIa."

Figure 7D:
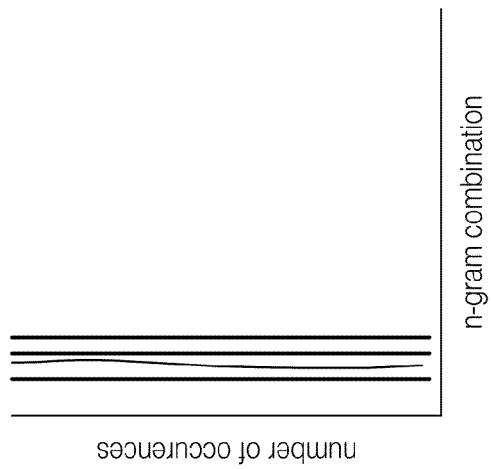
FIG. 7D shows another example distribution of n-grams in the filepaths associated with a malicious domain name.
Figure 7C:
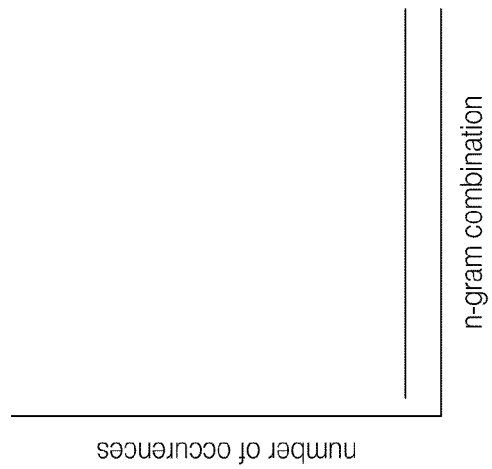
FIG. 7C shows an example distribution of n-grams in the filepaths associated with a malicious domain name.
Figure 7B:
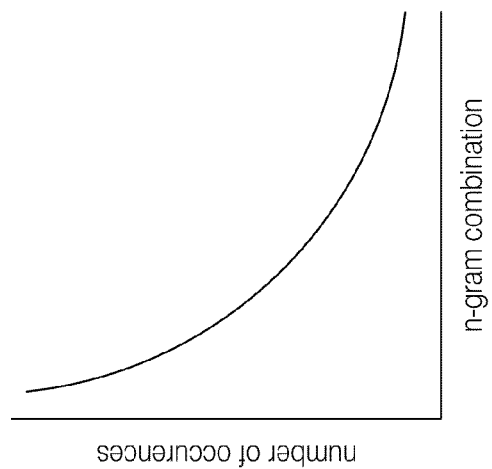
FIG. 7B shows an expected distribution of n-grams in the filepaths associated with a benign domain name.

Suitable program instructions stored on a non-transitory computer readable storage medium are further executed by a computer processor in order to cause the computing system of FIG. 12 to calculate a distribution of the n-grams for the filepaths of a domain name. Advantageously, the domain name is associated with a very large amount of Internet traffic. Examples of suitable domain names include google.com and facebook.com. FIG. 7B shows an example distribution for a benign domain name (such as google.com or facebook.com) and illustrates a smooth distribution between n-grams with a large number of occurrences and n-grams with a small number of occurrences. The distribution of FIG. 7B is the expected distribution. The distributions of FIG. 7C and FIG. 7D are example distributions for malicious domain names. FIG. 7C represents a domain name where each n-gram has a small number of occurrences. One can expect this kind of distribution where each of the filepaths represents strings of random characters. FIG. 7D represents a domain name where a small number of n-grams each have a large number of occurrences. One can expect this kind of distribution where the same filepath is used repeatedly. In should be understood that, while the distributions of FIGS. 7B, 7C, and 7D are graphical, the distributions can be numerical.

Figure 7E:
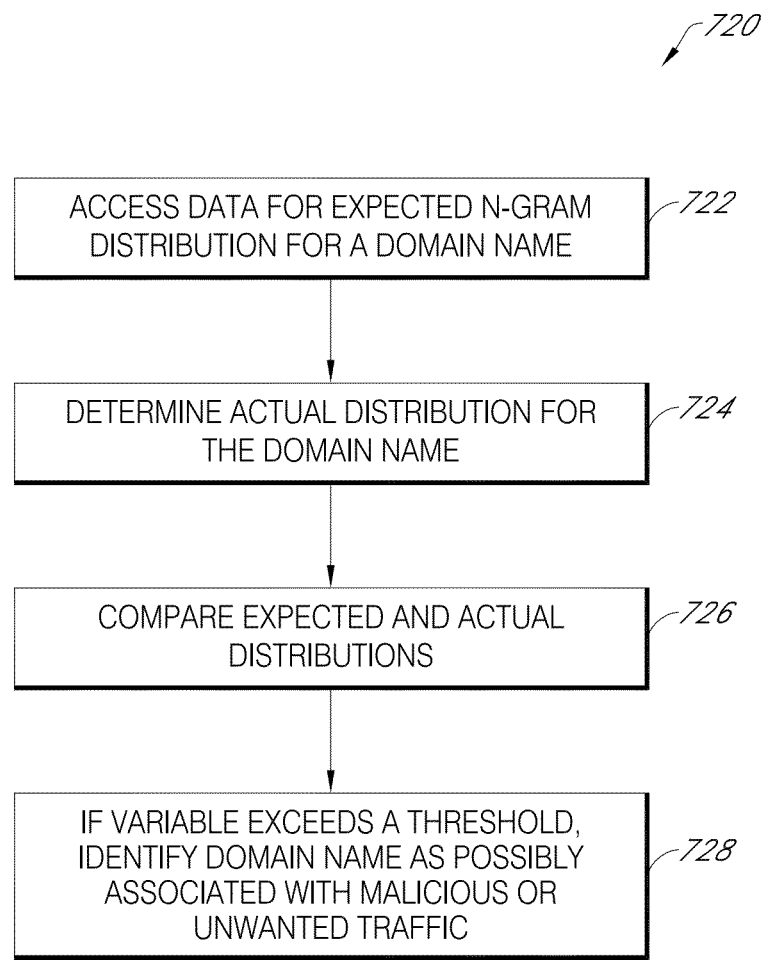
FIG. 7E is a flowchart of an example of a n-gram distribution comparison method.

FIG. 7E is a flowchart of an example of a n-gram distribution comparison method 720 of a vectoring system as applied to malware detection, according to various embodiments. The n-gram distribution comparison method 600 is based on the inventive realization that domain names with aberrant n-gram distributions are more likely to be associated with malicious software than domain names conforming to an expected distribution.

As shown in block 722, the system can access data for an expected n-gram distribution for a benign domain name. In block 724, the system determines the actual distribution for a particular domain name. In block 726, the expected n-gram distribution and actual distribution are compared. As shown in block 728, if the variance between the distributions exceeds a threshold, the URL associated with that domain name can be identified as possibly malicious. The variance and/or other suitable parameters relating to the n-grams can be output to the scoring processor discussed below.

Vector: Autocomplete

An optional vector is an autocomplete vector. When implemented in the foregoing scoring processor 106 of FIG. 1, the autocomplete vector can be used alone or in combination with other vectors. In certain embodiments, the autocomplete vector can be omitted.

Figure 8A:
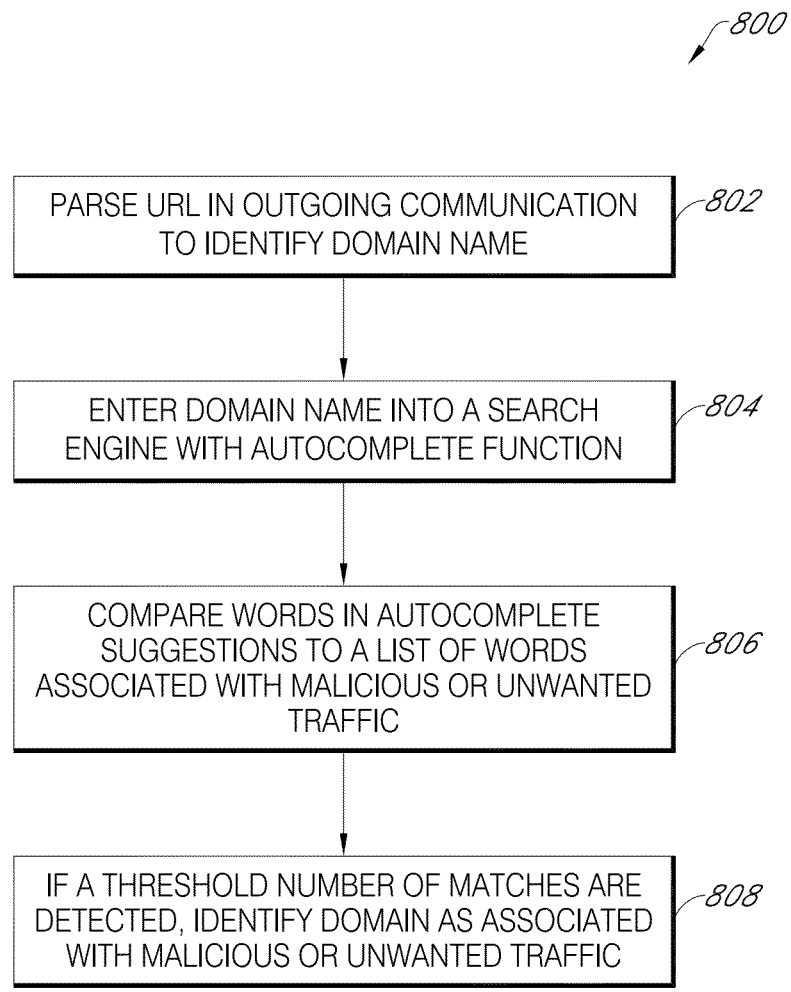
FIG. 8A is a flowchart of an example of an autocomplete analysis method.

FIG. 8A is a flowchart of an example of an autocomplete analysis method 800 of the vectoring system as applied to malware detection, according to various embodiments. The autocomplete analysis method 800 is based on the inventive realization that Internet-based crowdsourcing can be used to accurately identify malicious domain names.

As shown in block 802, suitable program instructions stored on a non-transitory computer readable storage medium are executed by a computer processor in order to cause the computing system of FIG. 12 to parse a URL using an appropriate computer-implemented textual analysis technique, such as regular expression matching, to identify the domain name. Referring to the example of FIG. 7A, the system can identify example.com as the domain name with suitable parsing techniques. Referring again to FIG. 8A, in block 804, the identified domain name (e.g., example.com) is inputted to a search engine with autocomplete functionality, such as the Google, Bing, and Yahoo! search engines.

Figure 8B:
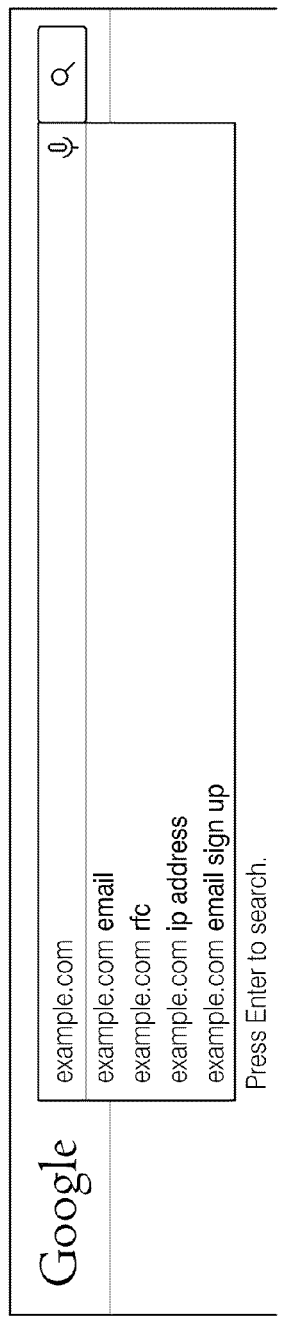
FIG. 8B are example autocomplete suggestions associated with a first domain name.
Figure 8C:
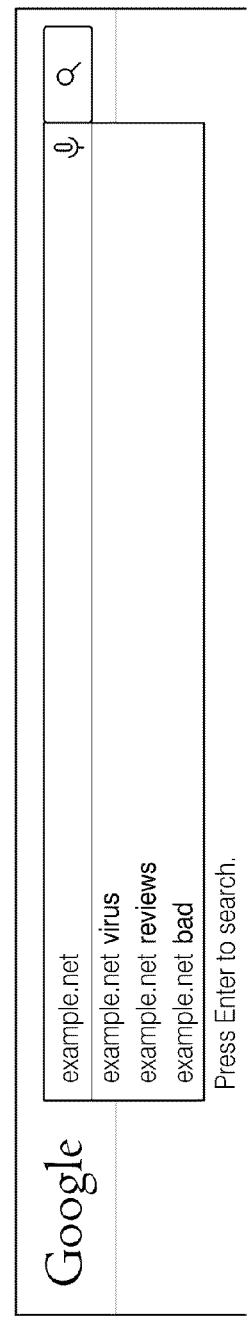
FIG. 8C are example autocomplete suggestions associated with a second domain name.

As shown in FIG. 8B, autocomplete functionality automatically displays letters and words to complete a query entered into the search engine (here, the Google search engine), based on the search engine provider's knowledge of the billions of searches across the world each day. In block 806, the words suggested by the autocomplete suggestions can be compared to a list of words associated with malicious software. An example list may include words such as virus, bad, malware, spyware, malicious, infection, Trojan, beacon, and the like. For example, in the example of FIG. 8C, when the domain name example.net was entered into a Google search engine query, the autocomplete functionality automatically displayed two words in the example list (virus, bad).

According to block 808 of FIG. 8A, if a threshold number of matches are detected (for instance, one match, two matches, etc.), the system software can designate the associated URL as a possibly malicious URL data item. The system can also output to the scoring processor the number of matches, the matching keywords (here, virus and bad), and other suitable parameters relating to the autocomplete functionality.

Vector: Registration Date

An optional vector is a domain name registration date vector. When implemented in the foregoing scoring processor 106 of FIG. 1, the domain name registration date vector can be used alone or in combination with other vectors. In certain embodiments, the domain name registration date vector can be omitted.

Figure 9A:
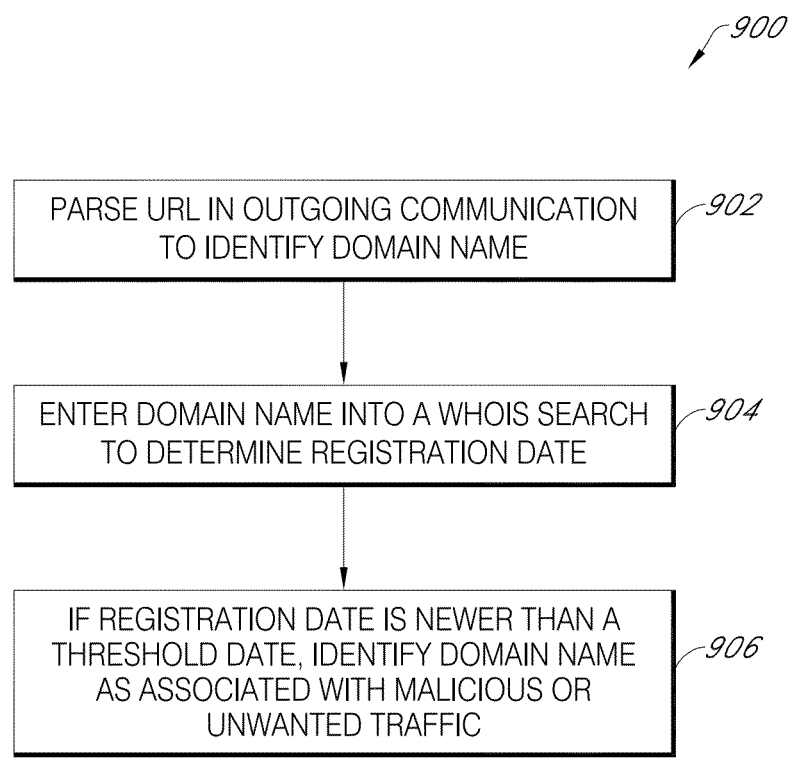
FIG. 9A is a flowchart of an example of a domain name registration date analysis method.

FIG. 9A is a flowchart of an example of a domain name registration date analysis method 900 of the vectoring system as applied to malware detection, according to various embodiments. The domain name registration analysis method 800 is based on the inventive realization that recently registered domain names are more likely to be associated with malicious software than other domain names.

As shown in block 902, suitable program instructions stored on a non-transitory computer readable storage medium are executed by a computer processor in order to cause the computing system of FIG. 12 to parse a URL using an appropriate computer-implemented textual analysis technique, such as regular expression matching, to identify the domain name. Referring to the example of FIG. 7A, the system can identify example.com as the domain name with suitable parsing techniques. Referring again to FIG. 9A, in block 904, the identified domain name (e.g., example.com) is inputted to a domain WHOIS query, a network WHOIS query, and/or a DNS record query with a suitable service such as Domain Dossier, provided by Hexillion Technologies. Such services provide query and response utilities for querying databases that store the registered users or assignees of Internet resources, such as domain names, IP address blocks, or autonomous systems. FIG. 9B is the result of a domain WHOIS query and network WHOIS query for example.com.

The system can parse the response to the query to identify the value associated with the "created" or "creation" date or another suitable field reflecting the domain name registration date. According to block 906 of FIG. 9A, if the registration date is newer than a threshold date (such as newer than one week or two days old), the system software can designate the associated URL as a possibly malicious URL data item. The system can also output to the scoring processor registration date and other suitable parameters relating to the registration date functionality.

Vector: Additional Examples

Table 1 includes additional examples of vectors. When implemented in the foregoing scoring processor 106 of FIG. 1, each of these vectors can be used alone or in combination with other vectors. In certain embodiments, these vectors can be omitted. As discussed below, these vectors can be used for training a machine learning algorithm and/or in evaluating a score for a URL based on a machine learning model.

| Vector | Value |
|---|---|
| Metascore | Metascore from beaconing malware pre-filter |
| Full Domain Name | 3LD.2LD.TLD |
| Domain Name | 2LD.TLD |
| Pre-Filter Hit Count | Number of pre-filters identifying URL as possibly malicious |
| Pre-Filter Hits | Which pre-filters identified the URL as possibly malicious |
| Pre-Filter Additional Output | Additional information from the pre-filter, such as the periodicity of the beaconing returned by the beaconing malware pre-filter |
| Pre-Filter Score | Additional scoring from the pre-filter, such as the number of connections in unusual time windows retuned by the timing pre-filter |
| Organization | OrgName associated with Network WHOIS record |
| Host | Registrar associated with Domain WHOIS record |
| Proxy Block Percent | The percentage of connections to this domain name that were blocked by a security device (e.g. local network proxy server) |

-continued

| Vector | Value |
| --- | --- |
| Proxy Block Count | Total connections to this domain name that were blocked by a security device (e.g. local network proxy server) |
| VirusTotal Score | Score determined by VirusTotal, an aggregator website that provides checking of files for viruses |
| VirusTotal Total | Number of anti-virus products and scan engines checked by VirusTotal for viruses |
| Is Graylisted? | The domain name has been previously identified as potentially associated with malicious software by machine learning software or human analyst within local network |
| Is Blacklisted? | The domain name has been previously identified as positively associated with malicious software by machine learning software or human analyst within local network |
| Country | The "registrant country," "admin country," and/or "tech country" returned in response to a WHOIS query or the country where the associated IP address is likely located |
| Rank | Alexa Rank or Google Page Rank |
| Site Search | Does search engine return a site hierarchy in the top search results |
| Known Hostname | Other domain names associated with underlying IP address |
| Computers Accessing | Number of computers within the local network that have accessed the domain name within a period of time |

It should be understood that the foregoing vectors are provided as examples. Additional or alternative vectors can be incorporated in the scoring process. For example, still other additional or alternative vectors include the following (which can also or alternatively be applied as pre-filters): number of destination IP addresses; total number of connections; the number of connections made to "good" or ranked domains in the period of time a URL was transmitted; the percentage of connections made to "good" or ranked domains the period of time a URL was transmitted; the number of potentially malicious connections for a computer; the percentage of potentially malicious connections compared to all connections for a computer; the number of time period blocks (e.g., 10-minute blocks, 1-hour blocks) with potentially malicious connections; the percentage of connections to a domain name or IP address that have a URL path; the average number of "/" characters in a filepath; and the variance in connections per unit time (such as connections per hour) for a particular domain name or IP address.

Scoring: Machine Learning

In at least one embodiment, the system uses machine learning techniques to identify a URL as malicious. Machine learning comprises at least two phases: training and evaluation.

Figure 10A:
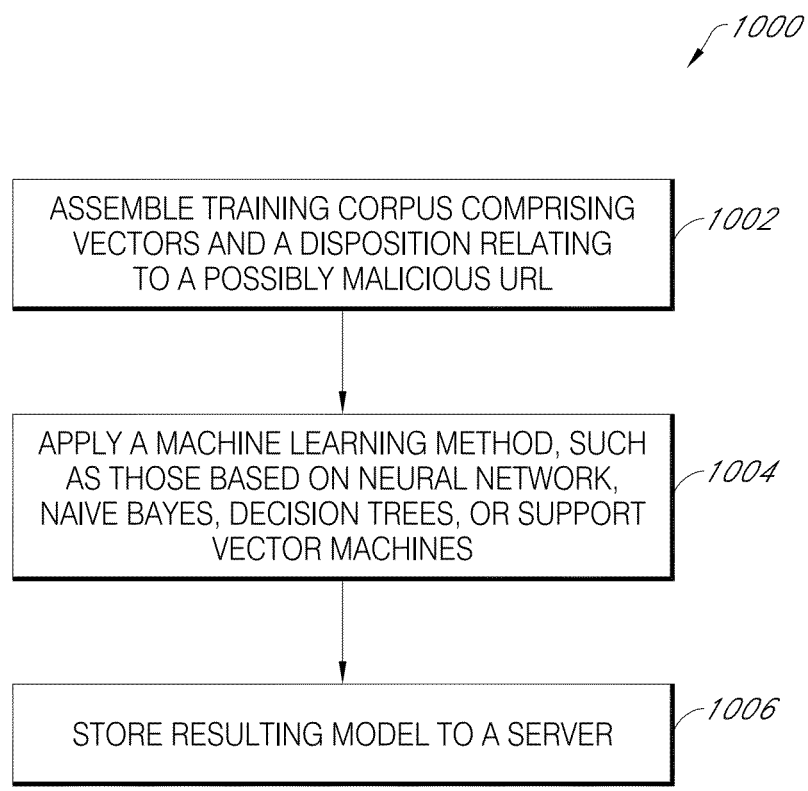
FIG. 10A is a flowchart of an example of a machine learning training method.

FIG. 10A is a flowchart of an example of a machine learning training method 1000 as applied to malware detection, according to various embodiments. During the training phase, a corpus of training data is used to derive a model. As shown in block 1102, a training corpus is assembled. The corpus comprises one or more of the above-described vectors and a disposition relating to a possibly malicious URL. It is important to note that any single vector might not yield any conclusive evidence over whether a URL is malicious or benign, but examining a plurality of such vectors could provide conclusive evidence. Thus, it is desirable that the model include data for a plurality of the above-described vectors.

It is desirable for the data inputted to the machine learning to be representative of the real world scenarios in which the machine learning techniques will ultimately be applied. Thus, as discussed above, the data used to derive the model can be taken directly from actual proxy logs.

The model also takes as input a disposition determined by a human analyst with expertise in diagnosing a URL as benign or malicious. The human analyst reviews the vectors, makes a determination that the URL is benign, malicious, or unknown, and enters the disposition into the machine learning algorithm along with the vectors. It is desirable to have fewer unknown samples, though at the same time is understood in the art that conclusively resolved benign/malicious dispositions can be difficult and expensive to obtain.

Next, as shown in block 1004, a machine learning method is applied to the corpus. The methods by which training can be done include, but are not limited to Support Vector Machines, Neural Networks, Decision Trees, Naïve Bayes, Logistic Regression, and other techniques from supervised, semi-supervised, and unsupervised training. The training or "model-derivation" may be practiced with any of the above techniques so long as they can yield a method for classifying URLs as benign or malicious. The corpus need not be analyzed in one batch. Machine learning can be refined over time by inputting additional vectors and associated dispositions. In block 1006, suitable program instructions stored on a non-transitory computer readable storage medium are executed by a computer processor in order to cause the computing system of FIG. 12 to store the resulting model to a server.

Figure 10B:
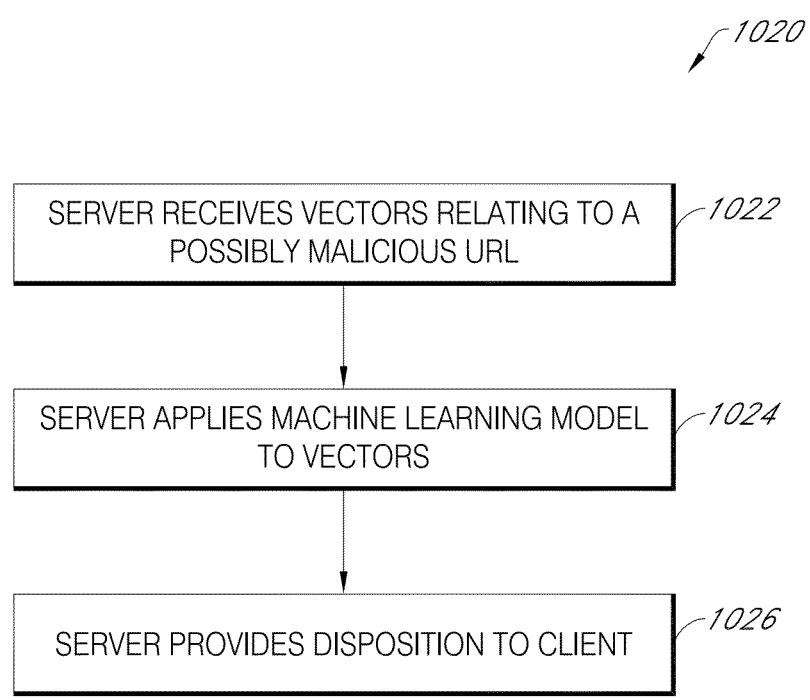
FIG. 10B is a flowchart of an example of a machine learning evaluation method.

Once the training is sufficient and a model is derived, the model can be used to automatically evaluate new instances of URLs that are presented to the computer or computer network in practice. In this regard, there is a second evaluation phase, wherein the model is applied to the vectors to determine whether a URL is likely malicious or benign. FIG. 10B is a flowchart of an example of a machine learning evaluation method 1020 as applied to malware detection, according to various embodiments. In block 1022, a server receives vectors relating to a possibly malicious URL. In block 1024, the server applies the previously determined machine learning model to the vectors. In block 1026, the server outputs a disposition based on the model. The output can be a binary classification (malicious or not malicious). Advantageously, however, the output is a score that represents the likelihood of or confidence in this distinction, such as a score from 0 to 100 where 0 represents an overwhelming likelihood that the URL is benign and 100 represents an overwhelming likelihood that the URL is malicious. As another example, the output might be an encoding of the form ("malicious", 0.95) which can be taken to mean that the model believes that a URL has a 95% chance of being malicious.

Scoring: Example User Interfaces

As discussed in the preceding section, URLs and vectors associated with the URLs can be presented to a human analyst. Such data can be presented via one or more user interfaces. The data can be displayed to facilitate disposition of the data for training the machine learning model. The data can also be displayed to allow for review of model output when URLs are automatically evaluated by the computing system.

Beaconing Malware Pre-Filter: Example User Interface

An example user interface is discussed with reference to FIG. 3E. Advantageously, according to an embodiment, the analyst may sort the clusters according to their determined scores (and/or metascores) so as to prioritize investigations into potential beaconing malware or other potential cyber threats. Further, the beaconing malware pre-filter system may advantageously automatically cluster or group many related data entities to enable rapid investigation and evaluation by an analyst to detect likely beaconing malware.

At optional block 344, analyst (or other user) feedback may optionally be used in future scoring by the beaconing malware pre-filter system. For example, if the analyst determines that a particular domain, identified by the system as potentially malicious, is not malicious, this information may be used by the system in future scoring of clusters. For example, the domain determined by the analyst to not be malicious may be whitelisted, or less weight may be applied to scores related to that domain.

Figure 3E:
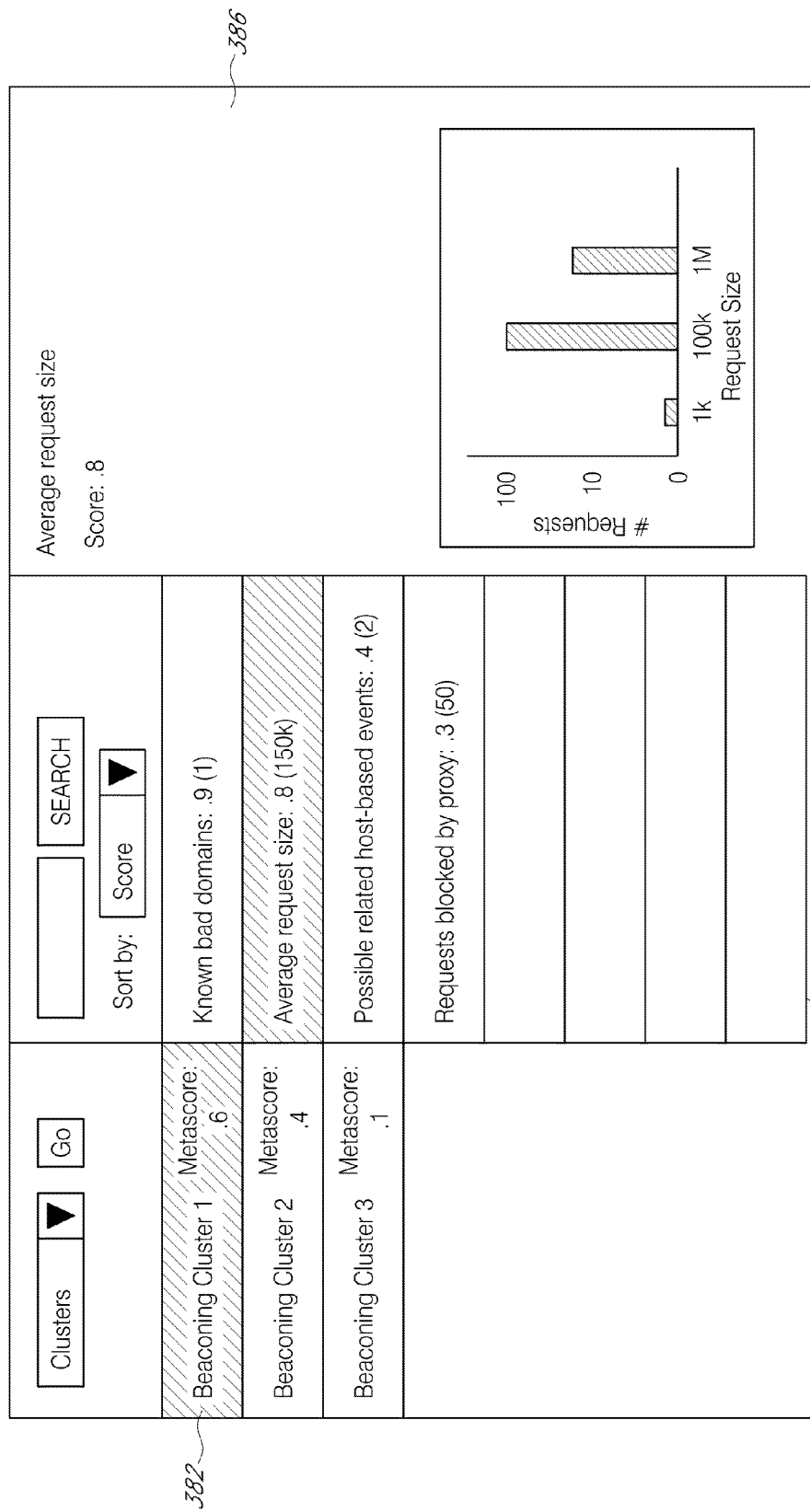
FIG. 3E illustrates an example cluster analysis user interface of the beaconing malware pre-filter system as applied to beaconing malware detection.

FIG. 3E illustrates an example cluster analysis user interface of the beaconing malware pre-filter system as applied to beaconing malware detection, according to an embodiment of the present disclosure. The example user interface of FIG. 3E includes a list of clusters 382 (e.g., each cluster may include multiple data entities associated with a particular seed connection pair), a list of scores 384, and a detailed view of a score 386. In various embodiments, more or fewer elements may be included in the user interface, and/or the elements may be arranged differently. The user interface of the FIG. 3E may include a list of clusters in a first column, a list of scores associated with a selected cluster in a middle column, and/or details associated with a selected score in a last column. Such an arrangement may advantageously enable an analyst to investigate various scores associated with a cluster. Additionally, clusters in such an interface may advantageously be prioritized according to any of multiple scores and/or metascores, as described above.

In the example user interface of FIG. 3E, an analyst or user has selected "Beaconing Cluster 1." Accordingly, various scores associated with that cluster may be displayed in the list of scores 384. For example, scores are listed for "Known bad domain" and "Average request size," among others. Additionally, in the example user interface, the analyst has selected the "Average request size" score. Accordingly, details related to that score may be displayed in the detailed view 386.

According to an embodiment, various items of information may be included in the user interface that may be useful to an analyst in evaluating and/or investigating the generated clusters. For example, metascores associated with each of the generated clusters may be shown in the list of clusters 382, and/or the clusters may be prioritized according to the metascores. In another example, absolute values and/or weighted values may be displayed in the list of scores 384 for each score. In another example, the detailed view 386 may include a graph that shows additional information related to the selected score. For example, in FIG. 3E, the graph shown in the detailed view 386 shows a distribution of the request sizes associated with each connection to an external domain or IP address in the cluster. In the example, around 20 requests had a size around 1 megabyte, around 100 requests had a size around 100 kilobytes, and around 1 request had a size around 1 kilobyte. In other embodiments, various other detailed information may be included in the user interface of FIG. 3E.

According to various embodiments, the beaconing malware pre-filter system as applied to beaconing malware detection may advantageously enable an analyst to detect and proactively remove an item of malware from various computer systems. Further, according to various embodiments the beaconing malware pre-filter system as applied to beaconing malware detection may advantageously enable an analyst to block particular domains determined to be related to beaconing malware, and/or take other step to protect and internal network from attack.

As explained above, in an embodiment, the beaconing malware pre-filter system may automatically evaluate the generated clusters to determine a likelihood that a given cluster represents beaconing malware activity. For example, the system may determine that a cluster having a metascore below a particular threshold is likely not related to beaconing malware activity, while a cluster having a metascore above another particular threshold likely is beaconing malware activity. In an embodiment, the system may determine that a cluster having a metascore within a particular range of thresholds requires additional analysis by an analyst as the likelihood of beaconing malware activity is not conclusive. In an embodiment, an analyst may adjust the thresholds, the metadata calculations, and/or the weighting applied to the scores. Further, the analyst may marks various clusters as, for example, beaconing malware, likely beaconing malware, likely not beaconing malware, and/or not beaconing malware. Additionally, the analyst may dispatch other analysts to review particular clusters and/or mark particular clusters for further analysis.

Additionally, in an embodiment a cluster graph similar to the cluster illustration of FIG. 3D may be made available to an analyst or other user of the beaconing malware pre-filter system. For example, an analyst may select a button (for example, an "Investigate in Graph" button) in a user interface of the system to view a cluster graph of a selected cluster.

Malicious Software Detection: Example User Interfaces

Figure 11A:
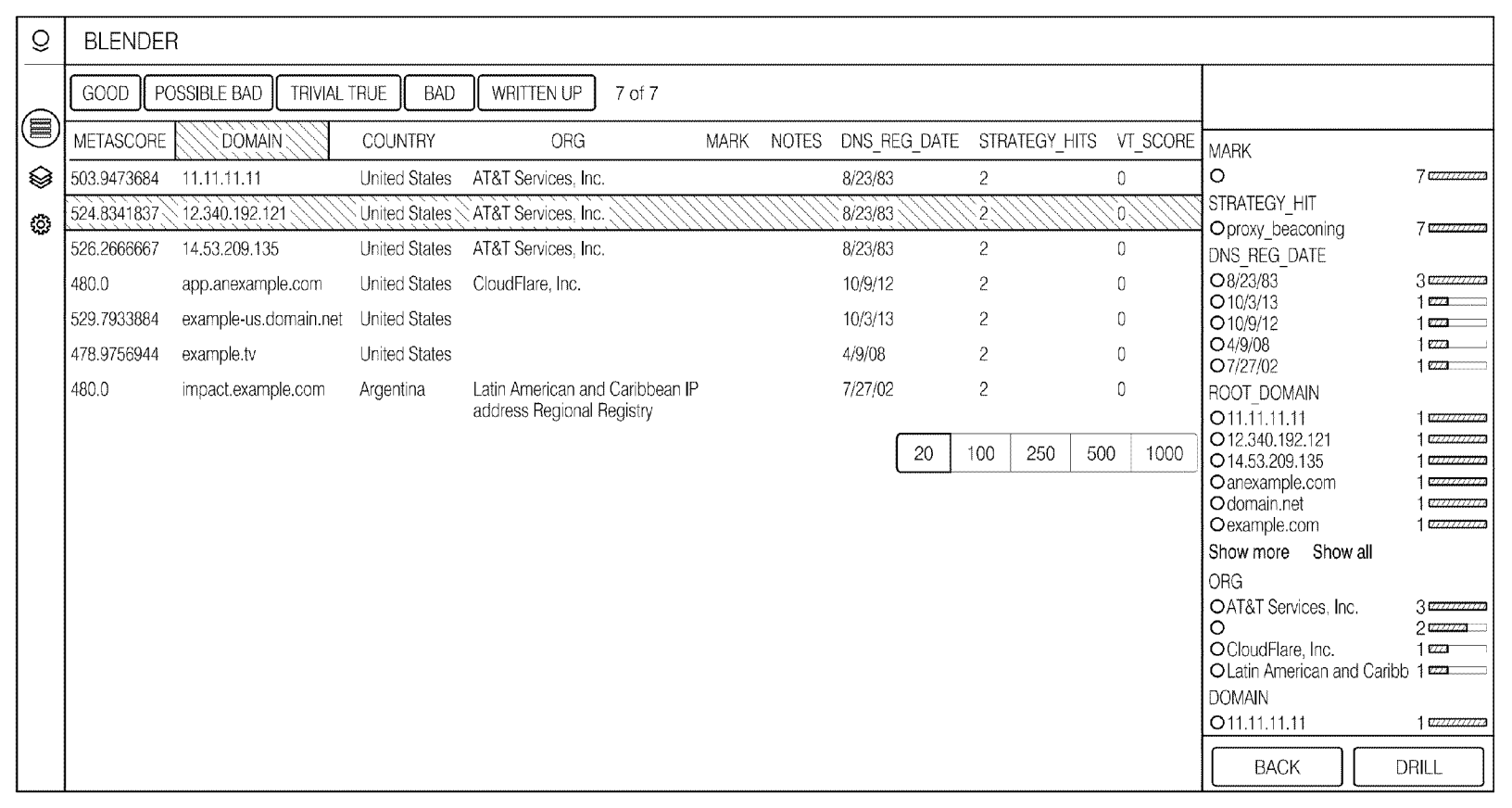

An example user interface for the computer-implemented malicious software detection system is discussed with reference to FIG. 11A. FIG. 11A presents a tabular-formatted listing of each possibly malicious URL identified by pre-filters. The listing is shown here in an online browser window. Nevertheless, other configurations are contemplated, such as a standalone application. The columns of the spreadsheets represent the URL and seven vectors: Metascore, Domain Name, Country, Organization, Registration Date, Pre-Filter Hits, and VirusTotal Score. Other suitable vectors that can be presented in such a table include, without limitation, Full Domain Name, Proxy Block Percent, Proxy Block Count, Is Graylisted?, Is Blacklisted?, Rank, URL, Pre-Filter Additional Output, Site Search, Autocomplete, and Autocomplete Keyword Matches. In various embodiments, more or fewer vectors may be included in the listing, and/or the vectors may be arranged differently. Additionally, the values associated with the vectors may advantageously be sortable.

With the table of FIG. 11A, the analyst can view the URLs and the associated vectors and make a disposition about whether some or all of the URLs are malicious, possibly malicious, benign, or unknown. The disposition will be used to train the machine learning model described above.

Figure 11B:
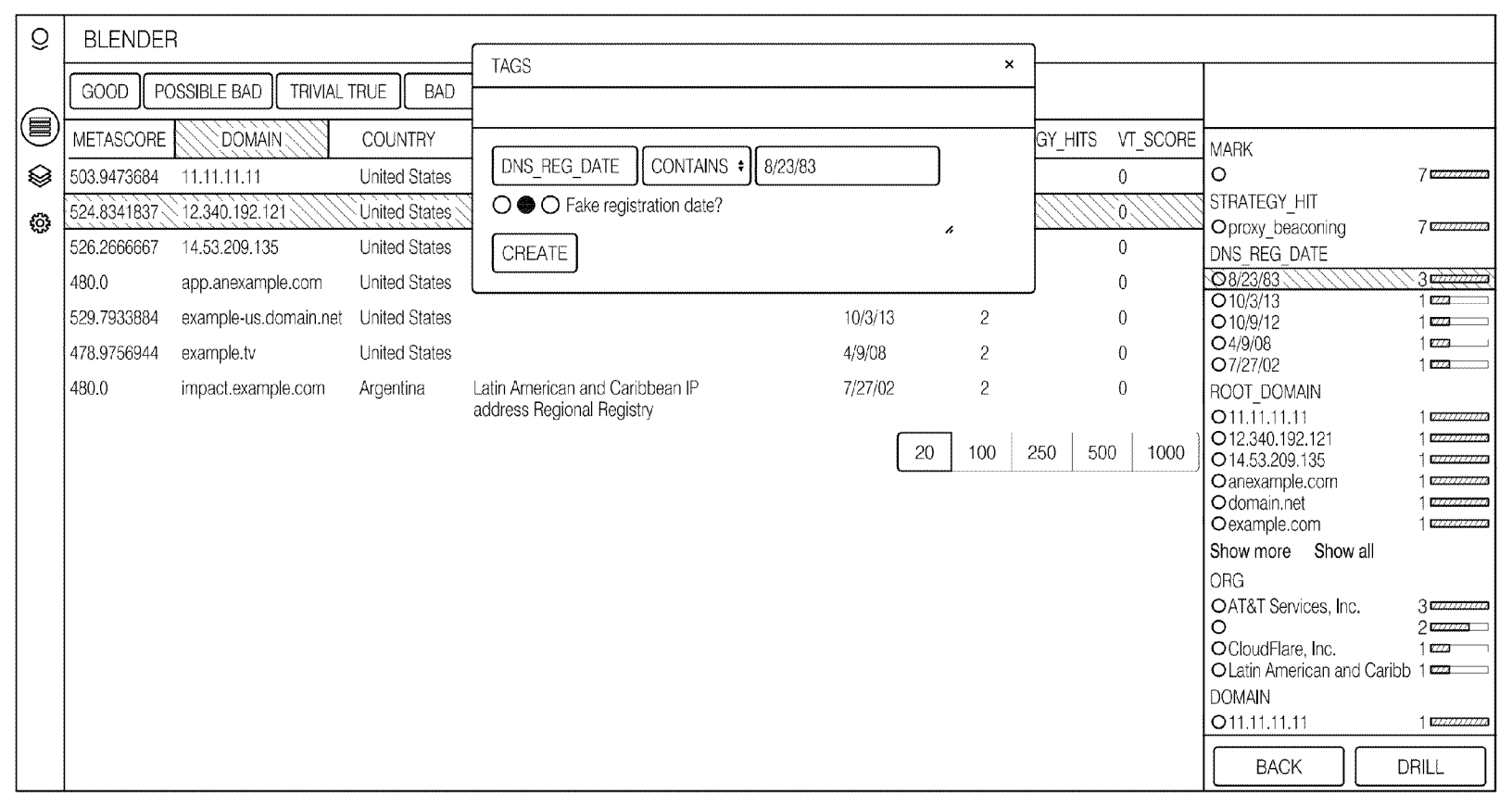
Figure 11C:
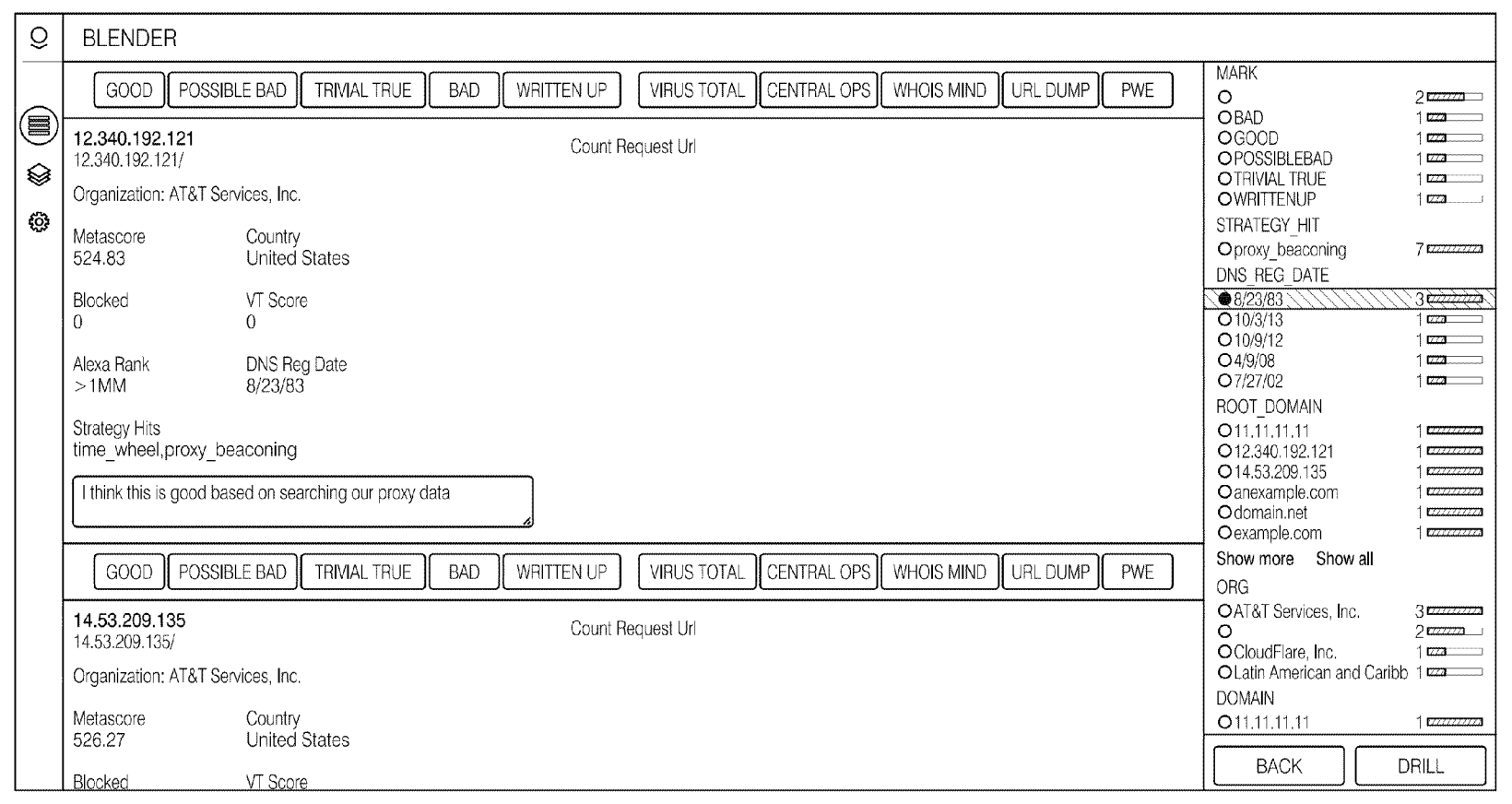

FIG. 11B illustrates an example interface for marking or tagging data from the listing of FIG. 11A. When reviewing the listing of FIG. 11A, an analyst may determine that the first three listings warrant further investigation, because they were registered by the same organization on the same date. Accordingly, as shown in FIG. 11B, the analyst can use a user interface to create a tag to identify entries with a particular DNS registration date are possibly bad (malicious). In this example, the interface allows the user to add a note indicating the reason for the tag, here, "Fake registration data?".

Additionally, in certain embodiments a drill down view similar to the illustration of FIG. 11O may be made available to an analyst or other user of the beaconing malware pre-filter system. For example, an analyst may select a button (for example, an "Investigate" button) in a user interface of the system to view additional information about a URL. In the view of FIG. 11O, the analyst can view key vector values. This interface can also allow the user to make a disposition about whether a URL is malicious, optionally with textual data describing the reason for the disposition. In certain embodiments, the drill down view additionally provides screen captures of the URL (3LD.2LD.TLD/filepath), the full domain name (3LD.2LD.TLD), and the domain name (2LD.TLD). Screen captures showing active web pages are less likely to be associated with malicious software than screen captures showing errors, such as a 404 not found error. This inventive realization can further aid the analyst in making a disposition of the potentially malicious URL.

Post-Filters

As discussed above with reference to FIG. 1, suitable program instructions stored on a non-transitory computer readable storage medium are executed by a computer processor in order to cause the computing system of FIG. 12 to execute one or more post-filters 108A, 108B on one or more of the scored data items from the scoring processor 106. The post-filters identify a second subset of data items from the scored data items as malicious URLs. In other words, the data items in the identified second subset are determined to have been transmitted in response to a command by malicious software. Any of the pre-filters and vectors discussed above can be implemented as post-filters.

Post-filters are particularly advantageous to improve the accuracy of the machine learning model. For example, an analyst may desire to increase the number of potentially malicious URLs passed to scoring processor 106 to provide more data points for machine learning training. After the potentially malicious URLs are scored, the scored URLs can be filtered with a post-filter to reduce the number of URLs passed to a human analyst for quality assurance checks. The human analyst can create a disposition for each of the filtered URLs and feed the disposition back into the machine learning model.

Post-filters are also useful to reduce costs or increase processing speed associated with scoring. For instance, executing queries to third-party services such as VirusTotal and WHOIS lookups take significant time and, in some instance, incur additional expense for pay services. Accordingly, in some embodiments, vectors associated with third-party services can be excluded from the scoring process and selectively implemented in post-filters, e.g., by a human analyst.

EXAMPLE

A computer-implemented system accesses a server's proxy log. The system is configured to execute the timing pre-filter and the beaconing malware pre-filter to identify potentially malicious URLs. An additional pre-filter is executed on the URLs identified by the beaconing malware pre-filer to filter out domain names that are not ranked in Alexa Internet's list of the top-1000 or top-10,000 websites. This subset of data items is likely to have been transmitted in response to a command by malicious software than items that are not in the subset.

The scoring processor executes a scoring process on the subset of data items, using at least four vectors including n-grams (e.g., variance from expected distribution), dictionary filtering (contains at least one word in dictionary), autocomplete (autocomplete results include at least one malware-related keyword), and pre-filter hit count. The score calculated according to the machine learning model indicates the relative likelihood that a particular data item was transmitted in response to a command by malicious software.

After scoring, a post-filter can automatically filter out data items to reduce the number of data items sent to a human analyst. For example, because uncommonly accessed domain names are more likely to be malicious than commonly accessed domain names, a post-filter can automatically filter out data items where fewer than ten computers on the network (for example, ten distinct IP addresses) have attempted to access the domain name. Additional post-filters can then be executed by a human analyst reviewing the filtered data items on a user interface. For example, the human analyst can execute VirusTotal and DNS queries as post-filters to assist disposition of URLs that the scoring process could not conclusively resolve as malicious or benign. The human analyst can create a disposition for each of the filtered URLs and feed the disposition back into the machine learning model.

Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

For example, FIG. 12 is a block diagram that illustrates a computer system 1200 upon which an embodiment may be implemented. For example, any of the computing devices discussed herein may include some or all of the components and/or functionality of the computer system 1200.

Computer system 1200 includes a bus 1202 or other communication mechanism for communicating information, and a hardware processor, or multiple processors, 1204 coupled with bus 1202 for processing information. Hardware processor(s) 1204 may be, for example, one or more general purpose microprocessors.

Computer system 1200 also includes a main memory 1206, such as a random access memory (RAM), cache and/or other dynamic storage devices, coupled to bus 1202 for storing information and instructions to be executed by processor 1204. Main memory 1206 also may be used for storing temporary variables or other intermediate information during execution of instructions to be executed by processor 1204. Such instructions, when stored in storage media accessible to processor 1204, render computer system 1200 into a special-purpose machine that is customized to perform the operations specified in the instructions.

Computer system 120 further includes a read only memory (ROM) 1208 or other static storage device coupled to bus 1202 for storing static information and instructions for processor 1204. A storage device 1210, such as a magnetic disk, optical disk, or USB thumb drive (Flash drive), etc., is provided and coupled to bus 1202 for storing information and instructions.

Computer system 1200 may be coupled via bus 1202 to a display 1212, such as a cathode ray tube (CRT) or LCD display (or touch screen), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 1200 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 1200 may implement the techniques described herein using customized hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to processor(s) 1204 executing one or more sequences of one or more instructions contained in main memory 1206. Such instructions may be read into main memory 1206 from another storage medium, such as storage device 1210. Execution of the sequences of instructions contained in main memory 1206 causes processor(s) 1204 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1210. Volatile media includes dynamic memory, such as main memory 1206. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid state drive of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may retrieve and execute the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN (or WAN component to communicated with a WAN). Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 1210, or other non-volatile storage for later execution.

TERMINOLOGY

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments. In addition, the inventions illustratively disclosed herein suitably may be practiced in the absence of any element which is not specifically disclosed herein.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computer system to identify malicious Uniform Resource Locator (URL) data items from a plurality of unscreened data items that have not been previously identified as associated with malicious URLs, the system comprising:
   one or more computer readable storage devices configured to store
      one or more software modules including computer executable instructions; and
      the plurality of unscreened data items associated with communications between computerized devices within a local network and external resources, the unscreened data items comprising a plurality of device identifiers for the computerized devices and a plurality of URLs referencing the external resources;
   a network connection configured to access, from a remote network not within the local network, a list of domain names satisfying a ranking condition based on Internet traffic data; and
   one or more hardware computer processors in communication with the one or more computer readable storage devices and configured to execute the one or more software modules in order to cause the computer system to:
      access, from the one or more computer readable storage devices, the plurality of unscreened data items;
      identify, from the plurality of unscreened data items, a plurality of connection records, each of the connection records indicating a communication from a computerized device to an external resource at a specific time, such that each of the connection records is associated with a device identifier and a URL,
      identify, from the plurality of connection records, one or more connection records having a common device identifier, the identified one or more connection records associated with one or more URLs;

parse the one or more URLs for one or more domain names, each of the one or more URLs associated with a domain name;

based on a determination that none of the one or more domain names satisfies a threshold position in the list of domain names, designate the one or more URLs as possible malicious URL data items;

assign a score based on a plurality of factors relating to the possible malicious URL data items, the factors comprising the determination that none of the one or more domain names satisfies the threshold position in the list of domain names.

2. The system of claim 1, the plurality of unscreened data items comprising a plurality of beaconing malware-related data items and the one or more hardware computer processors further configured to execute the one or more software modules in order to cause the computer system to access, from the one or more computer readable storage devices, the plurality of beaconing malware-related data items;

generate, based on the accessed beaconing malware-related data items, a plurality of connection pairs, each of the connection pairs indicating communications between an internal source within the local network and an external destination that is not within the local network;

identify a plurality of connection pairs having a common internal source and a common external destination;

generate a time series of connection pairs based on the identified plurality of connection pairs;

filter out noise from the at least one time series to generate a filtered at least one time series;

compute a variance in the filtered at least one time series; and based on a determination that the variance satisfies a threshold:

designate a connection pair associated with the filtered at least one time series as a seed, the designated connection pair including the common internal source and the common external source;

generate a data item cluster based on the designated seed, wherein generating the data item cluster comprises:

adding the designated seed to the data item cluster;

accessing, from the one or more computer readable storage devices, the clustering strategy; and adding to the data item cluster, based on the clustering strategy, one or more beaconing malware-related data items determined to be associated with the designated seed; and score the generated data item cluster, the factors comprising the data item cluster score.

3. The system of claim 1, the one or more computer readable storage devices configured to store a plurality of domain names associated with URLs in communications from computerized devices within a local network from a period of time, and the one or more hardware computer processors further configured to execute the one or more software modules in order to cause the computer system to access, from the one or more computer readable storage devices, the plurality of domain names;

based on a determination that none of the one or more domain names is included in the plurality of domain names, designate the one or more URLs as possible malicious URL data items, the factors comprising the determination that none of the one or more domain names is included in the plurality of domain names.

4. The system of claim 1, the one or more computer readable storage devices configured to store a plurality of dictionary words, and the one or more hardware computer processors further configured to execute the one or more software modules in order to cause the computer system to access, from the one or more computer readable storage devices, the plurality of dictionary words;

based on a determination that none of the one or more domain names is included in the plurality of dictionary words, designate the one or more URLs as possible malicious URL data items, the factors comprising the determination that none of the one or more domain names is included in the plurality of dictionary words.

5. The system of claim 1, the one or more computer readable storage devices configured to store a plurality of filepaths associated with URLs in communications from computerized devices within a local network from a period of time, and the one or more hardware computer processors further configured to execute the one or more software modules in order to cause the computer system to access, from the one or more computer readable storage devices, the plurality of filepaths;

parse a URL for an associated filepath;

based on a determination that the filepath is included in the plurality of filepaths, designate the URL as a possible malicious URL data item, the factors comprising the determination that the filepath is included in the plurality of filepaths.

6. The system of claim 1, the one or more computer readable storage devices configured to store a distribution of n-grams for filepaths associated with a domain name having a rank indicating that the domain name is associated with a amount of Internet traffic, and store a second distribution of n-grams for filepaths associated with the domain name; and the one or more hardware computer processors further configured to execute the one or more software modules in order to cause the computer system to compare the expected distribution of n-grams to the actual distribution of n-grams, the factors comprising a variance between the distributions.

7. The system of claim 1, the network connection configured to access, from a remote network not within the local network, an Internet search engine providing an autocomplete function that automatically displays words to complete a query entered into the search engine and to receive from the remote network the words suggested by the autocomplete function, the one or more computer readable storage devices configured to store a list of words associated with malicious software; and the one or more hardware computer processors further configured to execute the one or more software modules in order to cause the computer system to transmit to the Internet search engine a query comprising a domain name associated with a URL, and receive words displayed by the search engine in response to the query, the factors comprising the received words that are also included in the list of words.

8. The system of claim 1,
the network connection configured to access, from a remote network not within the local network, an Internet service providing WHOIS and/or DNS registration data to receive from the remote network domain registration data,
the one or more hardware computer processors further configured to execute the one or more software modules in order to cause the computer system to
transmit to the Internet search engine a query comprising a domain name associated with a URL, and
receive a domain registration date in response to the query;
the factors comprising the received domain registration date.

9. The system of claim 1, the score based on a Support Vector Machine model, a Neural Network model, a Decision Tree model, a Naïve Bayes model, or a Logistic Regression model.

\* \* \* \* \*